(12) United States Patent
Doyle et al.

(10) Patent No.: US 12,198,205 B2
(45) Date of Patent: *Jan. 14, 2025

(54) SYSTEM AND METHOD FOR AGGREGATING SOCIAL NETWORK FEED INFORMATION

(71) Applicant: Salesforce, Inc., San Francisco, CA (US)

(72) Inventors: Liam Tomar Fontvieille Doyle, San Francisco, CA (US); Andrew Ian Craven, London (GB); Teddy Kite Joe, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,859

(22) Filed: Sep. 25, 2023

(65) Prior Publication Data
US 2024/0013321 A1 Jan. 11, 2024

Related U.S. Application Data

(63) Continuation of application No. 16/950,498, filed on Nov. 17, 2020, now Pat. No. 11,803,920, which is a
(Continued)

(51) Int. Cl.
*G06Q 30/02* (2023.01)
*G06Q 30/0251* (2023.01)
(Continued)

(52) U.S. Cl.
CPC ......... *G06Q 50/01* (2013.01); *G06Q 30/0269* (2013.01); *G06Q 30/0282* (2013.01)

(58) Field of Classification Search
CPC .... G06Q 30/02; G06Q 50/01; G06Q 30/0269; G06Q 30/0282; G06Q 30/0254; G06Q 10/067; G06Q 30/0246; G06Q 30/0207
See application file for complete search history.

(56) References Cited

U.S. PATENT DOCUMENTS 5,577,188 A 11/1996 Zhu
5,608,872 A 3/1997 Schwartz
(Continued)

FOREIGN PATENT DOCUMENTS

EP 2297685 A1 3/2011
IN 659MUM2011 A 6/2011
(Continued)

OTHER PUBLICATIONS

Mitra, pP.; Baid, K., Targeted advertisng for online social networks (English), 2009 Firts International Conference on Networked Digital Technologies (pp. 366-372), Jul. 1, 2009 (Year: 2009).*
(Continued)

*Primary Examiner* — Marilyn G Macasiano
(74) *Attorney, Agent, or Firm* — Polygon IP, LLP

(57) ABSTRACT

In accordance with disclosed embodiments, there are provided methods, systems, and apparatuses for aggregating social network feed information including, for example, means for receiving user activity data from one or more social networks; parsing the user activity data to render a plurality of targeting parameters culled from the user activity data; matching one or more of the plurality of targeting parameters with advertising conditions for a social media campaign, wherein the advertising conditions of the social media campaign are contextually relevant to the one or more targeting parameters matched; recommending the social media campaign via a user interface; receiving authorization to launch the social media campaign via input received at the user interface or automatically launching the social media campaign based on pre-defined parameters; and deploying the social media campaign to one or many social media networks. Other related embodiments are disclosed.

20 Claims, 12 Drawing Sheets

Related U.S. Application Data continuation of application No. 16/437,409, filed on Jun. 11, 2019, now Pat. No. 10,839,466, which is a continuation of application No. 13/947,065, filed on Jul. 21, 2013, now Pat. No. 10,319,046.

(60) Provisional application No. 61/674,169, filed on Jul. 20, 2012.

(51) Int. Cl.
*G06Q 30/0282* (2023.01)
*G06Q 50/00* (2012.01)

(56) References Cited

U.S. PATENT DOCUMENTS

| | | |
|---|---|---|
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |
| 5,821,937 A | 10/1998 | Tonelli |
| 5,831,610 A | 11/1998 | Tonelli |
| 5,873,096 A | 2/1999 | Lim |
| 5,918,159 A | 6/1999 | Fomukong |
| 5,963,953 A | 10/1999 | Cram |
| 6,092,083 A | 7/2000 | Brodersen |
| 6,169,534 B1 | 1/2001 | Raffel |
| 6,178,425 B1 | 1/2001 | Brodersen |
| 6,189,011 B1 | 2/2001 | Lim |
| 6,216,135 B1 | 4/2001 | Brodersen |
| 6,233,617 B1 | 5/2001 | Rothwein |
| 6,266,669 B1 | 7/2001 | Brodersen |
| 6,295,530 B1 | 9/2001 | Ritchie |
| 6,324,568 B1 | 11/2001 | Diec |
| 6,324,693 B1 | 11/2001 | Brodersen |
| 6,336,137 B1 | 1/2002 | Lee |
| D454,139 S | 3/2002 | Feldcamp |
| 6,367,077 B1 | 4/2002 | Brodersen |
| 6,393,605 B1 | 5/2002 | Loomans |
| 6,405,220 B1 | 6/2002 | Brodersen |
| 6,434,550 B1 | 8/2002 | Warner |
| 6,446,089 B1 | 9/2002 | Brodersen |
| 6,535,909 B1 | 3/2003 | Rust |
| 6,549,908 B1 | 4/2003 | Loomans |
| 6,553,563 B2 | 4/2003 | Ambrose |
| 6,560,461 B1 | 5/2003 | Fomukong |
| 6,574,635 B2 | 6/2003 | Stauber |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee |
| 6,621,834 B1 | 9/2003 | Scherpbier |
| 6,654,032 B1 | 11/2003 | Zhu |
| 6,665,648 B2 | 12/2003 | Brodersen |
| 6,665,655 B1 | 12/2003 | Warner |
| 6,684,438 B2 | 2/2004 | Brodersen |
| 6,711,565 B1 | 3/2004 | Subramaniam |
| 6,724,399 B1 | 4/2004 | Katchour |
| 6,728,702 B1 | 4/2004 | Subramaniam |
| 6,728,960 B1 | 4/2004 | Loomans |
| 6,732,095 B1 | 5/2004 | Warshavsky |
| 6,732,100 B1 | 5/2004 | Brodersen |
| 6,732,111 B2 | 5/2004 | Brodersen |
| 6,754,681 B2 | 6/2004 | Brodersen |
| 6,763,351 B1 | 7/2004 | Subramaniam |
| 6,763,501 B1 | 7/2004 | Zhu |
| 6,768,904 B2 | 7/2004 | Kim |
| 6,782,383 B2 | 8/2004 | Subramaniam |
| 6,804,330 B1 | 10/2004 | Jones |
| 6,826,565 B2 | 11/2004 | Ritchie |
| 6,826,582 B1 | 11/2004 | Chatterjee |
| 6,826,745 B2 | 11/2004 | Coker |
| 6,829,655 B1 | 12/2004 | Huang |
| 6,842,748 B1 | 1/2005 | Warner |
| 6,850,895 B2 | 2/2005 | Brodersen |
| 6,850,949 B2 | 2/2005 | Warner |
| 7,340,411 B2 | 3/2008 | Cook |
| 7,620,655 B2 | 11/2009 | Larsson |
| 8,073,850 B1 | 12/2011 | Hubbard |
| 8,291,016 B1* | 10/2012 | Whitney ............... H04L 67/535 |
| | | 709/224 |
| 9,633,399 B2* | 4/2017 | George ............. G06Q 30/0277 |
| 10,319,046 B2 | 6/2019 | Doyle |
| 10,339,541 B2* | 7/2019 | Strutton ............... H04L 51/066 |
| 10,839,466 B2 | 11/2020 | Doyle |
| 2001/0044791 A1 | 11/2001 | Richter |
| 2002/0022986 A1 | 2/2002 | Coker |
| 2002/0029161 A1 | 3/2002 | Brodersen |
| 2002/0029376 A1 | 3/2002 | Ambrose |
| 2002/0035577 A1 | 3/2002 | Brodersen |
| 2002/0042264 A1 | 4/2002 | Kim |
| 2002/0042843 A1 | 4/2002 | Diec |
| 2002/0072951 A1 | 6/2002 | Lee |
| 2002/0082892 A1 | 6/2002 | Raffel |
| 2002/0129352 A1 | 9/2002 | Brodersen |
| 2002/0140731 A1 | 10/2002 | Subramaniam |
| 2002/0143997 A1 | 10/2002 | Huang |
| 2002/0152102 A1 | 10/2002 | Brodersen |
| 2002/0161734 A1 | 10/2002 | Stauber |
| 2002/0162090 A1 | 10/2002 | Parnell |
| 2002/0165742 A1 | 11/2002 | Robins |
| 2003/0004971 A1 | 1/2003 | Gong |
| 2003/0018705 A1 | 1/2003 | Chen |
| 2003/0018830 A1 | 1/2003 | Chen |
| 2003/0066031 A1 | 4/2003 | Laane |
| 2003/0066032 A1 | 4/2003 | Ramachandran |
| 2003/0069936 A1 | 4/2003 | Warner |
| 2003/0070000 A1 | 4/2003 | Coker |
| 2003/0070004 A1 | 4/2003 | Mukundan |
| 2003/0070005 A1 | 4/2003 | Mukundan |
| 2003/0074418 A1 | 4/2003 | Coker |
| 2003/0088545 A1 | 5/2003 | Subramaniam |
| 2003/0120675 A1 | 6/2003 | Stauber |
| 2003/0151633 A1 | 8/2003 | George |
| 2003/0159136 A1 | 8/2003 | Huang |
| 2003/0187921 A1 | 10/2003 | Diec |
| 2003/0189600 A1 | 10/2003 | Gune |
| 2003/0191743 A1 | 10/2003 | Brodersen |
| 2003/0204427 A1 | 10/2003 | Gune |
| 2003/0206192 A1 | 11/2003 | Chen |
| 2003/0225730 A1 | 12/2003 | Warner |
| 2004/0001092 A1 | 1/2004 | Rothwein |
| 2004/0010489 A1 | 1/2004 | Rio |
| 2004/0015981 A1 | 1/2004 | Coker |
| 2004/0027388 A1 | 2/2004 | Berg |
| 2004/0128001 A1 | 7/2004 | Levin |
| 2004/0186860 A1 | 9/2004 | Lee |
| 2004/0193510 A1 | 9/2004 | Catahan |
| 2004/0199489 A1 | 10/2004 | Barnes-Leon |
| 2004/0199536 A1 | 10/2004 | Barnes Leon |
| 2004/0199543 A1 | 10/2004 | Braud |
| 2004/0249854 A1 | 12/2004 | Barnes-Leon |
| 2004/0260534 A1 | 12/2004 | Pak |
| 2004/0260659 A1 | 12/2004 | Chan |
| 2004/0268299 A1 | 12/2004 | Lei |
| 2005/0050555 A1 | 3/2005 | Exley |
| 2005/0091098 A1 | 4/2005 | Brodersen |
| 2010/0257023 A1 | 10/2010 | Kendall |
| 2011/0238674 A1 | 9/2011 | Avner |
| 2011/0302006 A1 | 12/2011 | Avner |
| 2011/0313842 A1 | 12/2011 | Avner |
| 2012/0011158 A1 | 1/2012 | Avner |
| 2012/0047174 A1 | 2/2012 | Avner |
| 2012/0239694 A1 | 9/2012 | Avner |
| 2012/0290399 A1* | 11/2012 | England ............... G06Q 50/01 |
| | | 705/14.66 |
| 2012/0290446 A1* | 11/2012 | England ............... G06Q 50/01 |
| | | 705/27.1 |
| 2013/0073336 A1* | 3/2013 | Heath ............... G06Q 30/02 |
| | | 705/7.29 |
| 2013/0073378 A1* | 3/2013 | Naveh ............... G06Q 50/01 |
| | | 709/204 |
| 2013/0103637 A1 | 4/2013 | Dror |

(56) References Cited

U.S. PATENT DOCUMENTS

| | | | |
|---|---|---|---|
| 2013/0151331 A1 | 6/2013 | Avner | |
| 2013/0191455 A1* | 7/2013 | Penumaka | H04L 67/02 |
| | | | 709/204 |
| 2014/0019547 A1 | 1/2014 | Narasimha | |
| 2014/0039990 A1* | 2/2014 | Georgi | G06Q 30/0229 |
| | | | 705/14.3 |
| 2014/0039995 A1 | 2/2014 | Ngo | |
| 2014/0129326 A1 | 5/2014 | Munitz | |

FOREIGN PATENT DOCUMENTS

| | | | | |
|---|---|---|---|---|
| TW | 201319987 A * | 5/2013 | | G06Q 30/02 |
| WO | WO 2010/001406 A1 * | 1/2010 | | G06Q 30/00 |
| WO | WO 2013/016320 A2 * | 1/2013 | | G06Q 30/02 |
| WO | 2013043296 A1 | 3/2013 | | |
| WO | WO 2013/123462 A1 * | 8/2013 | | G06Q 30/00 |
| WO | 2017044349 A1 | 3/2017 | | |

OTHER PUBLICATIONS

Rao, T.; Nagpal, S., Real-time geo influence in social networks (English); 2011 3rd International Conference on Electronics Computer Technology (vol. 1, 2011, pp. 246-250), Apr. 1, 2011 (Year: 2011).*

Kim, E.S.; Han, S.S., An Analytical Way to Find Influencers on Social Networks and Validate their Effects in Disseminating Social Games (English), 2009 International Conference on Advances in Social Network Analysis and Mining (2009, pp. 41-46), Jul. 1, 2009 (Year: 2009).*

"Taykey—Clients," http://www.taykey.com/clients/, (accessed Jul. 8, 2013), 1 page.

"Taykey—Contact US," http://www.taykey.com/contact-US/, (accessed Jul. 8, 2013), 2 pages.

"Taykey—Home," http://www.taykey.com/, (accessed Jul. 8, 2013), 1 page.

"Taykey—News," http://www.taykey.com/latest-news, (accessed Jul. 8, 2013), 3 pages.

"Taykey—Team," http://www.taykey.com/team/, (accessed Jul. 8, 2013), 1 page.

"Taykey—Technology," http://www.taykey.com/technology/, (accessed Jul. 8, 2013), 2 pages.

Final Office Action for U.S. Appl. No. 13/947,065 dated Dec. 19, 2016, 39 pages.

Final Office Action for U.S. Appl. No. 13/947,065, dated Jun. 14, 2018, 36 pages.

Mitra, A., Trust Driven Information Sharing in Peer-to-Peer Social Networks: Design and Analysis, [Doctoral dissertation, University of Manitoba], 2008, 152 pages, ProQuest Dissertations Publishing.

Notice of Allowance dated Jun. 29, 2023 for U.S. Appl. No. 16/950,498 (pp. 1-9).

Notice of Allowance for U.S. Appl. No. 13/947,065, dated Jan. 25, 2019, 8 pages.

Notice of Allowance for U.S. Appl. No. 16/437,409, dated Jul. 6, 2020, 9 pages.

Office Action for U.S. Appl. No. 13/947,065 dated Nov. 16, 2017, 34 pages.

Office Action for U.S. Appl. No. 13/947,065, dated Apr. 18, 2016, 43 pages.

Office Action for U.S. Appl. No. 13/947,065, dated Aug. 14, 2015, 32 pages.

S. Buckley; M. Ettl; P. Jain; R. Luss; M. Petrik; R.K. Ravi; C. Venkatramani, Social media and customer behavior analytics for personalized customer engagements (English), IBM Journal of Research and Development (vol. 58, Issue: 5/6, pp. 9): 7:1-7: 12), Sep. 1, 2014 (Year: 2014).

Santos, P.; Ribeiro, F.R.; Metrolho, J., Using pervasive computing technologies to deliver personal and public ads in public spaces ( English), 7th Iberian Conference on Information Systems and Technologies (CISTI 2012) (pp. 1-6), Jun. 1, 2012 (Year: 2012).

Siyu Tang; N. Blenn; C. Doerr; P. Van Mieghem, Digging in the Digg Social News Website (English), IEEE Transactions on Multimedia (Volumn: 13, Issue: 5, pp. 1163-1175), Jun. 30, 2012 (Year: 2012).

Sonntag, Diana; Schneider, Sarah; Mdege, Noreen; Ali, Shehzad; Schmidt, Burkhard, Beyond Food Promotion: A Systematic Review on the influence of the Food Industry on Obesity-Related Dietary Behaviour among Children, Nutrients, 7(10), 8565-8576, Oct. 16, 2015 (Year: 2015).

Thyne, Maree; Robertson, Kirsten; Watkins, Leah; Casey, Olly, Retailers targeting children with set collection promotions: the child's perspective, International Journal of Retail & Distribution Management 47.6: 643-658. Emerald Group, (Year: 2019).

* cited by examiner

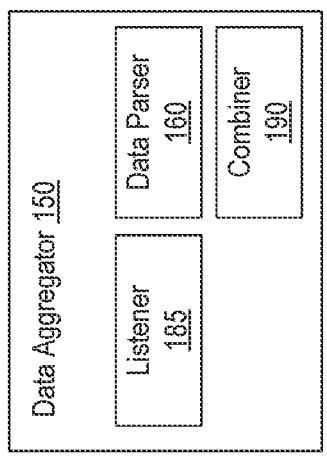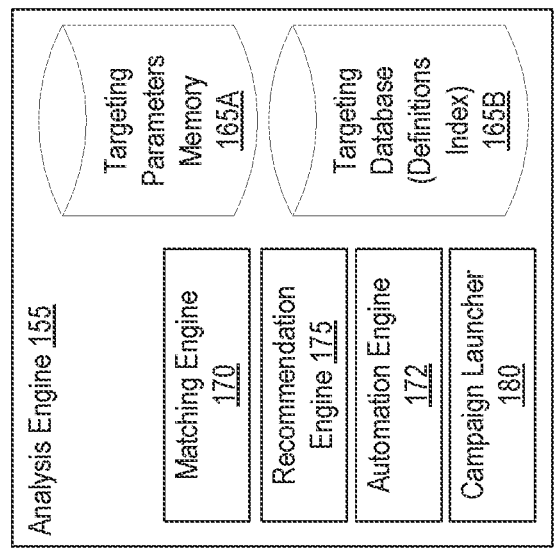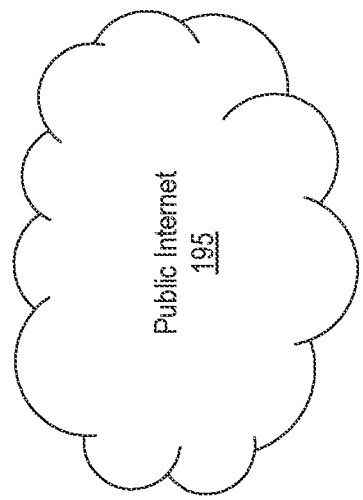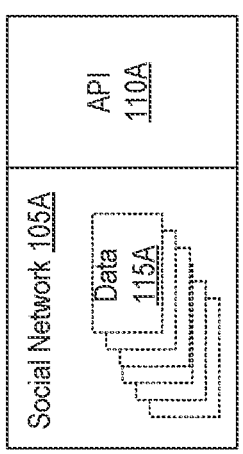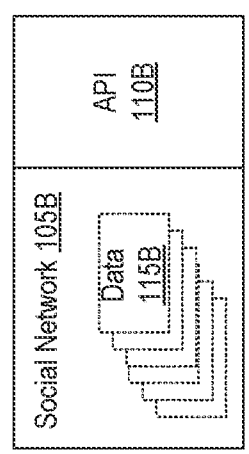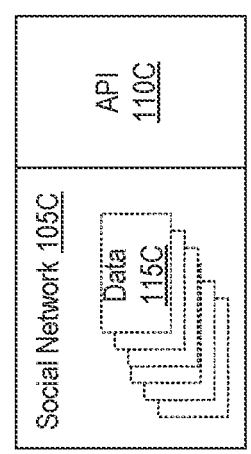
FIG. 1A

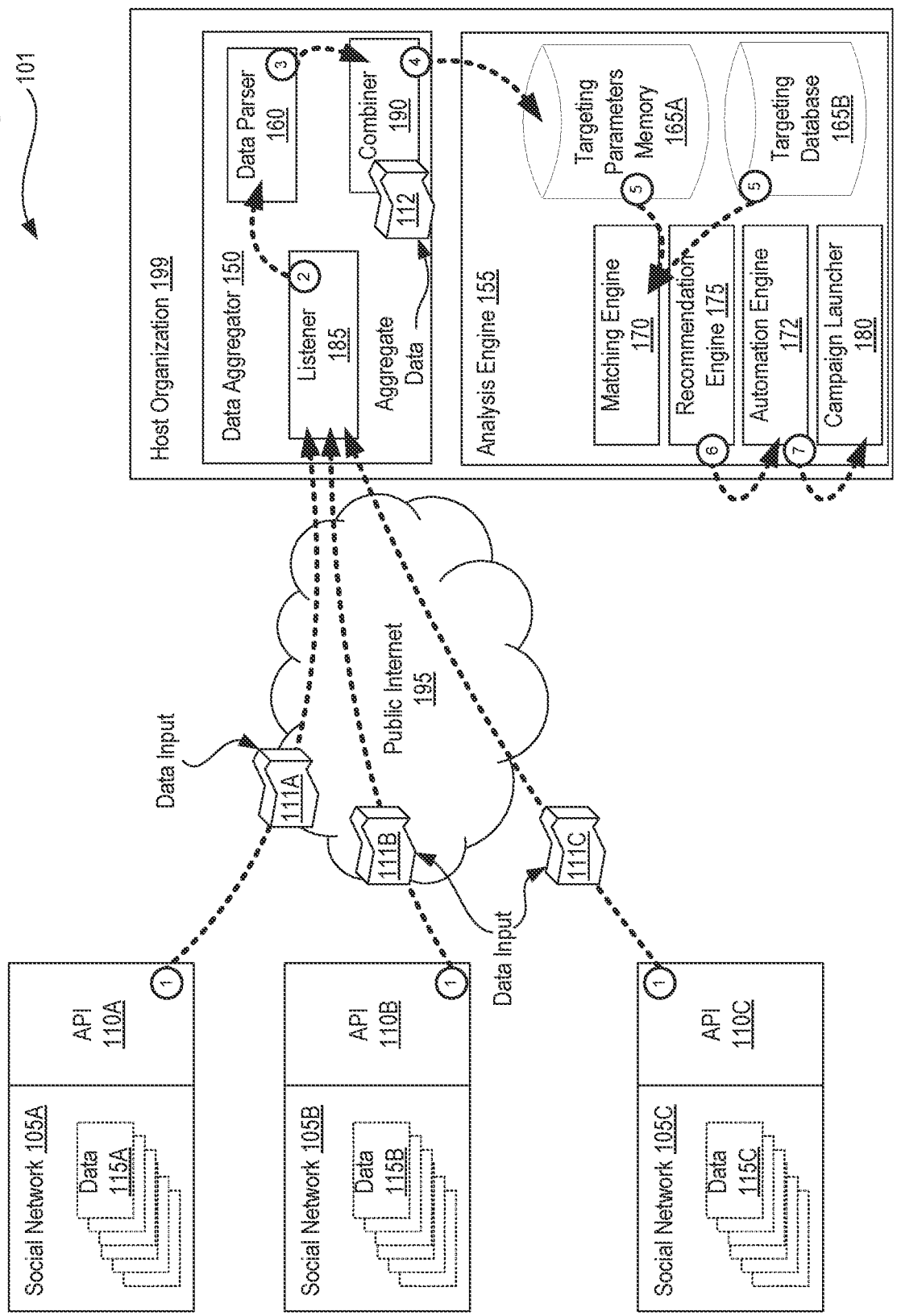

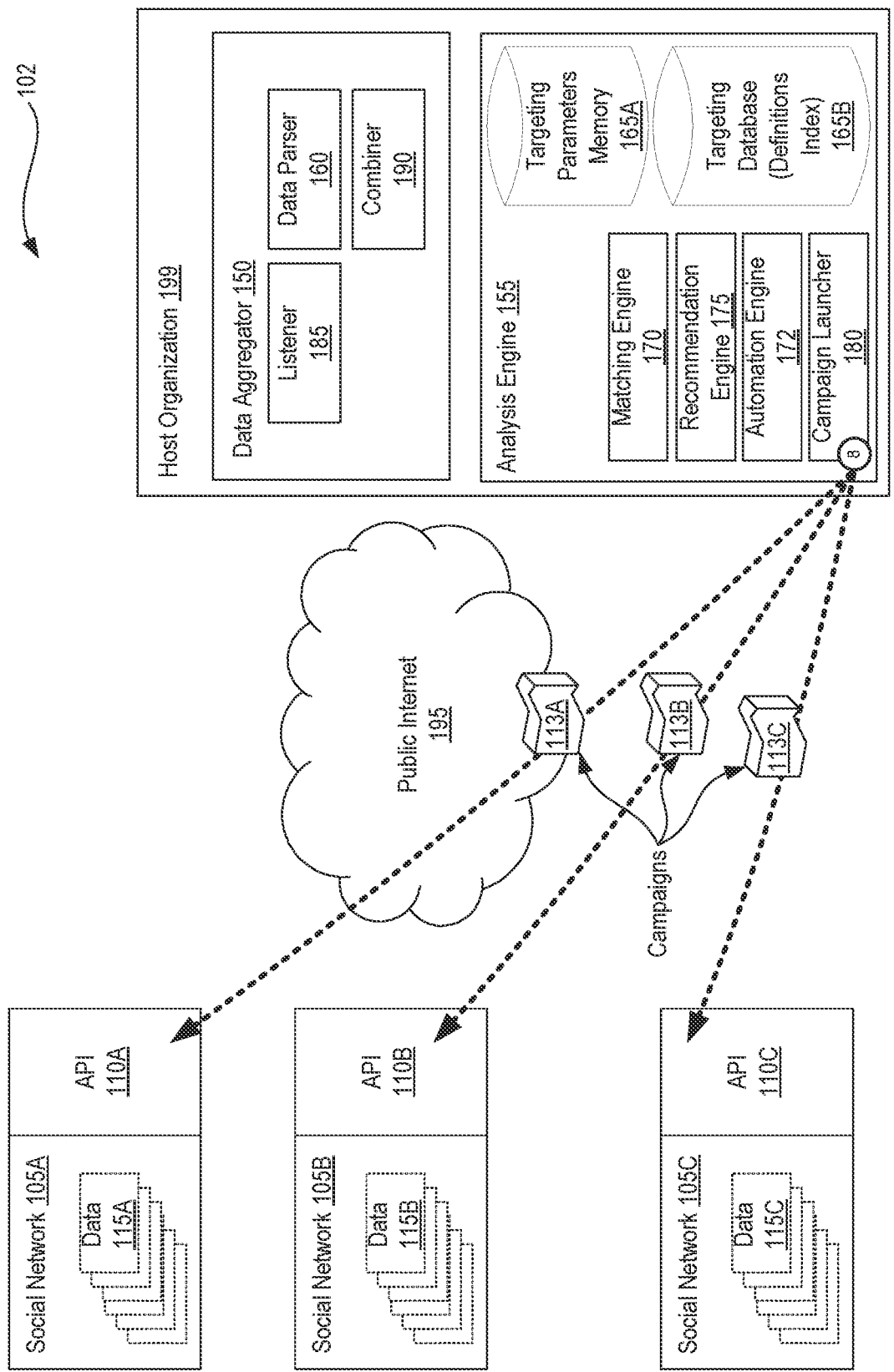

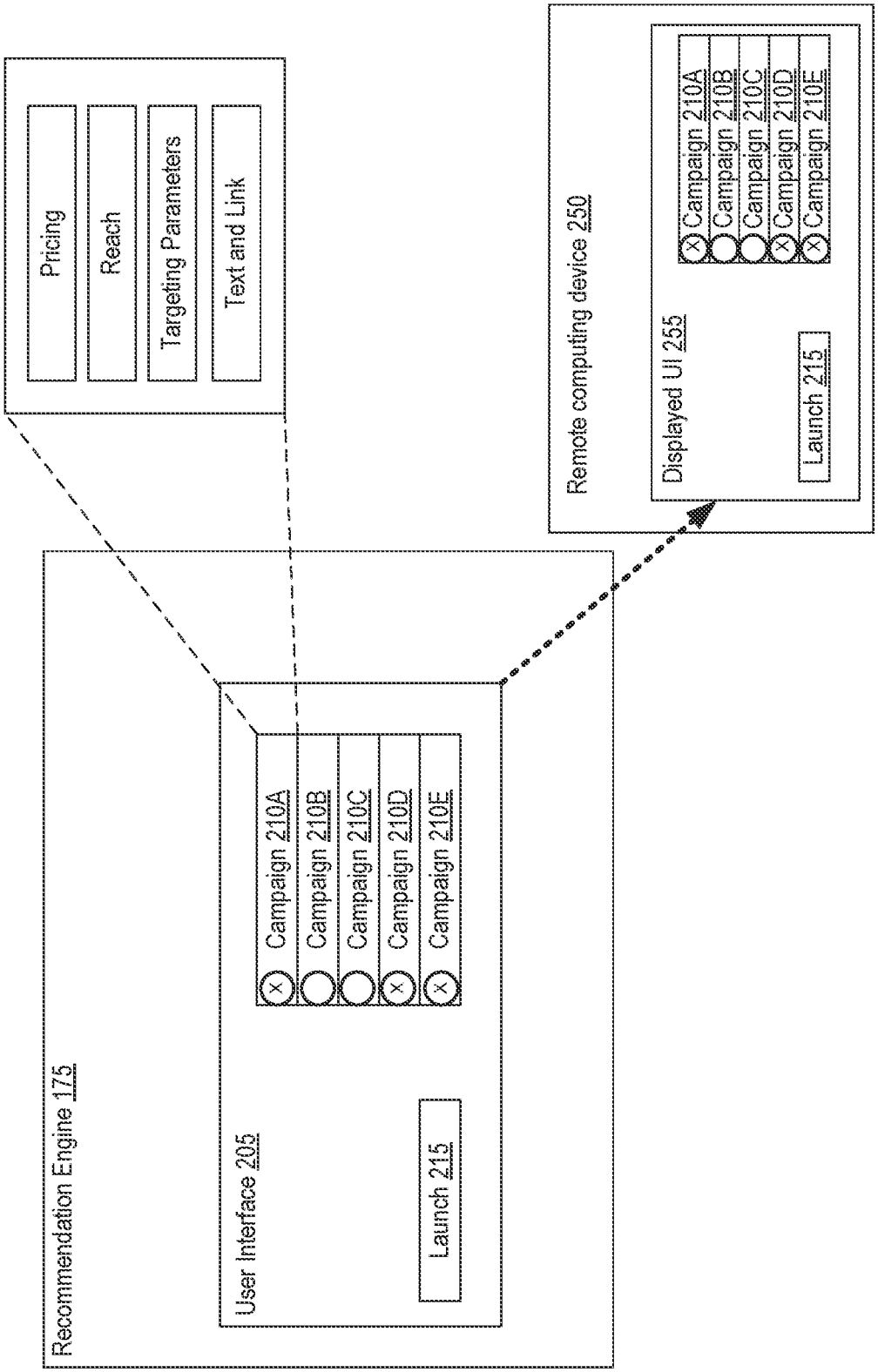

SYSTEM AND METHOD FOR AGGREGATING SOCIAL NETWORK FEED INFORMATION

CROSS-REFERENCE TO RELATED APPLICATIONS

This application is related to, and claims priority to U.S. patent application Ser. No. 16/950,498, filed Nov. 17, 2020 and entitled "SYSTEM AND METHOD FOR AGGREGATING SOCIAL NETWORK FEED INFORMATION," which is a continuation of U.S. patent application Ser. No. 16/437,409, filed Jun. 11, 2019 and entitled "SYSTEM AND METHOD FOR AGGREGATING SOCIAL NETWORK FEED INFORMATION," which is now issued as U.S. Pat. No. 10,839,466, which is a continuation of U.S. patent application Ser. No. 13/947,065, filed Jul. 21, 2013 and entitled "SYSTEM AND METHOD FOR AGGREGATING SOCIAL NETWORK FEED INFORMATION," which is now issued as U.S. Pat. No. 10,319,046, which claims the benefit under 35 U.S.C. § 119(e) of U.S. provisional patent application No. 61/674,169, filed Jul. 20, 2012 and entitled "SYSTEM AND METHOD FOR AGGREGATING SOCIAL NETWORK FEED INFORMATION," all of which are incorporated herein by reference in their entireties and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF TECHNOLOGY

Embodiments of the invention relate generally to the field of computing, and more particularly, to methods and systems for aggregating social network feed information.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Social networks provide a means to analyze social structures and the entities they represent including individuals, businesses, organizations, locations, and social concepts, as well as the interrelationships between them. Analysis of social networks may reveal both micro and macro socio economic patterns, locate influential entities, and provide details regarding various network dynamics, especially about the entities that make up the social network.

Social media refers to the means of interactions among users (e.g., typically individuals but also legal entities) including the manner in which such users create, share, and exchange information and ideas in virtual communities, typically via the public Internet through specialized applications or large social networks made available to such users. Non-public social networks are also available, such as networks restricted to a particular organization or university. In other instances, sub-networks corresponding to a sub-set of individuals commonly exist within a much larger publicly accessible social network.

Social media and social networks have exploded in their popularity in recent years and in doing so, a vast amount of data is now being generated by the users, individuals, and entities both directly and indirectly. Such data may be useful to businesses seeking alternative ways in which to target and deploy advertising—whether they are brand awareness, public interest, or other types of campaigns.

Notwithstanding the potential benefits of such information, businesses and other organizations have struggled to identify the most efficient means by which to collect, analyze, and consume or act upon such data. The present state of the art may therefore benefit from methods, systems, and apparatuses as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1A depicts an exemplary architecture in accordance with described embodiments;

FIG. 1B depicts another exemplary architecture in accordance with described embodiments;

FIG. 1C depicts another exemplary architecture in accordance with described embodiments;

FIG. 2C depicts another exemplary architecture in accordance with described embodiments;

DETAILED DESCRIPTION

Figure 1D:
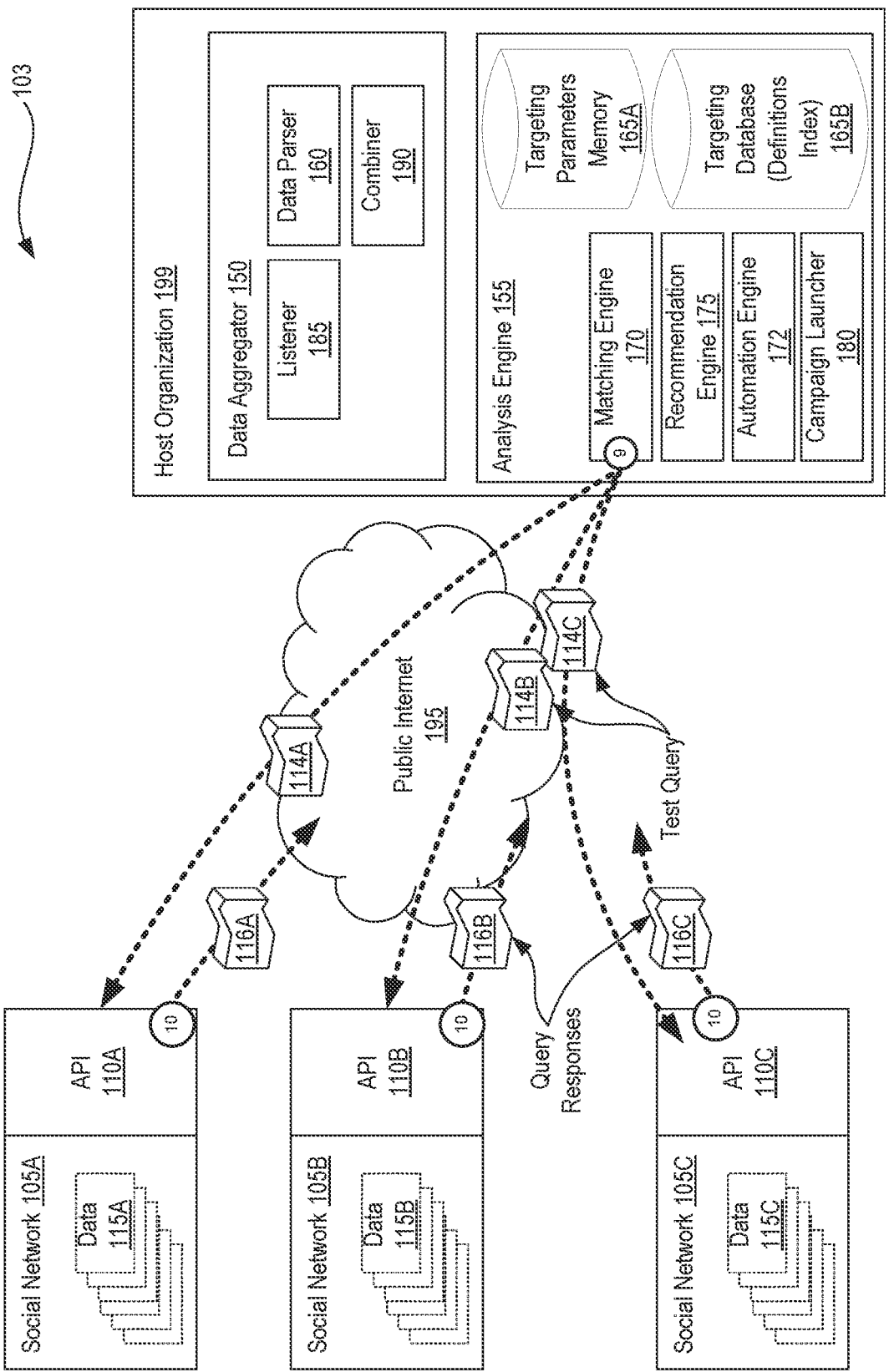
FIG. 1D depicts another exemplary architecture in accordance with described embodiments.

Described herein are systems, devices, and methods for aggregating social network feed information in an on-demand service environment. Such systems, devices, and methods may include, for example, means for: receiving user activity data from one or more social networks; parsing the user activity data to render a plurality of targeting parameters culled from the user activity data; matching one or more of the plurality of targeting parameters with advertising conditions for a social media campaign, wherein the advertising conditions of the social media campaign are contextually relevant to the one or more targeting parameters matched; recommending the social media campaign via a user interface; receiving authorization to launch the social media campaign via input received at the user interface or automatically launching the social media campaign based on pre-defined parameters; and deploying the social media campaign to one or many social media networks.

Social networks and social media platforms are increasingly becoming the primary web destination for Internet users. As such, it is not uncommon for a user to have multiple social network accounts. For example, a typical user may be have accounts on consumer social network services including Facebook®, Twitter®, LinkedIn®, Instagram®, Pinterest®, etc. The user may also have an account on an enterprise social network service, such as Chatter®, which is offered by salesforce.com, inc. While usage for each social network account may differ, a user's activities on each social network will nevertheless generate information about that particular user's likes, projects, preferences, and so forth.

Each social network provider may compile information about its own users in some manner and for its own purposes, however, no single entity leverages the information available from multiple social network services in an aggregated fashion in such a way that data spanning multiple networks may be simultaneously analyzed and used to make decisions, such as whether and how to deploy direct response, PR, brand awareness campaigns, etc.

Social networks provide a relatively new advertising space and a model by which purveyors of such platforms can profit from their investment in the underlying architecture. However, the old model of simply throwing ads at a target audience and hoping they are in the right frame of mind when they happen to see an advertisement simply is not an effective use of advertising dollars or the advertising space. When advertisers interact with social networks and other social media platforms for the sake of advertising, results may be improved by understanding social trends and other social moments occurring as well as what the users are discussing in the context of those trends and moments. In other words, ads can be made more effective when they are socially relevant to the user's current thinking as it correlates to such trends and social moments.

Dividing up conventional target audiences into smaller pieces based on demographics such as age, sex, location, and so forth is common place. What is not available heretofore is the ability to tailor selection and triggering of advertising on the basis of a user's social context and relevance at any given point in time.

The systems, devices, and methods described herein provide means by which such aggregated data may be received, analyzed, and consumed in pursuance of a particular objective, such as determining whether to launch a campaign. Embodiments are further provided to simplify the logistics of selecting and deploying campaigns for appropriate keywords, demographics, psychographics, trends, and context onto a variety of social networks or social media platforms and interfaces.

For instance, according to one embodiment, user activity information is received from a first social network; additional user activity information is received from a second social network; the first and second user activity information is analyzed for identifying content from which to trigger a display or distribute advertisements to the first and second social networks which are contextually relevant to the user activity information, network metadata, temporal, system, location and potentially other data points received from the first and second networks. In other embodiments, functionality determines which platform is appropriate for use as a data source or campaign target, or both.

In alternative embodiments, a social data aggregator is utilized as the source such that aggregated user activity data from multiple social networks or social media interfaces may be retrieved from a single source via the social data aggregator, subsequent to which the data is analyzed for identifying content from which to trigger the aforementioned display/campaign that is contextually relevant to the aggregated user activity data and other information received.

Conventionally, social networks do not utilize information from other social networks in determining marketing and ad campaigns. According to certain embodiments, user activity information is aggregated from one or more social network services and then used for any of a variety of purposes, including but not limited to: delivering relevant advertising content, delivering service improvements, tailoring a user's experience, providing brand awareness without selling a particular product, providing public awareness outreach on behalf of governments, charities, and non-profits, and so forth. In certain embodiments, functionality aggregates social data from a number of sources or users within the same social network.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1A depicts an exemplary architecture 100 in accordance with described embodiments. In particular, there are multiple social networks 105A-C depicted on the left, each of which are communicably interfaced with the public Internet 195 via their respective APIs 110A-C (Application Programming Interfaces) through which data 115A-C for the respective social networks 105A-C may be observed, listened to, retrieved, etc. Such data 115A-C may be, for example, user activity data pertaining to the users' activities, comments, connections, likes, tweets, reviews, and so forth which is generated within the respective social networks 105A-C as the users engage with such sites.

Thus, social network 105A includes API 110A and data 115A representing multiple users, entities, concepts, themes, discussions, trends, and so forth, based on the activity and interactions of the users within social network 105A. Similarly, social network 105B includes data 115B and API 110B, and social network 105C includes data 115C and API 110C. Three social networks 105A-C are depicted but there may be a different number of social networks are represented, including a single social network within which aggregation takes place amongst multiple users or other sources within the single social network.

Data aggregator 150 is depicted separately in this particular embodiment but may be part of, or located with the analysis engine 155 in other embodiments. Data aggregator 150 includes listener 185 capable of listening to streams and data flows originating at the social networks 105A-C by connecting with their respective APIs 110A-B via the public Internet. Data aggregator 150 further includes parser 160 and combiner 190 which aggregates, combines, or otherwise joins the individualized data 115A-C from the respective social networks 105A-C into a single output or a single source which may be accessed, communicated, or consumed by another entity, such as the analysis engine 155.

Analysis engine 155 is similarly interfaced to the public Internet 195 and may receive data 115A-C of the respective social networks 105A-C or may alternatively source the data 115A-C in a combined or aggregated form from data aggregator 150.

Analysis engine 155 includes a targeting parameters memory 165A having targeting parameters and a targeting database 165B (or definitions index) having advertising conditions (e.g., targetable content or subject matter to be targeted), rules, or filters controlling which targeting parameters are to be targeted for events, such as advertising campaigns.

Data parser 160 analyzes incoming data source and identifies targetable concepts, keywords, events, handles, locations, demographics, psychographics, and so forth, within the data received.

Parsing is the process of breaking up and analyzing a stream of text or other data source into words, key words, phrases, locations, demographics, psychographics, symbols, user IDs, user handles, memes, event and incident names, or other meaningful elements called targetable parameters. The list of targeting parameters becomes input for further processing such as parsing or text mining, for instance, by the matching engine 170. Parsing extracts meaning from available data. Tokenization may operate as a first step of parsing to identify granular elements (e.g., tokens) within a stream of data, but parsing then goes on to use the context that the token is found in to determine the meaning and/or the kind of information being referenced. Because data entering the data aggregator is not homogenous (e.g., there are many different sources in many different formats), certain embodiments employ at least one data parser (e.g., 160) per data feed, and in some cases more than one.

Matching engine 170 operates to match targeting parameters with targeting data elements, such as advertising conditions specified or selected by advertisers. Recommendation engine 175 generates recommendations and provides automatic recommendations to advertising clients and other end users as to campaigns that may be initiated on the basis of analyzed data via automation engine 172. The recommendation engine 175 may provide complete campaigns or partial campaigns, such as inputs to a campaign. Such recommendations may therefore take on a number of formats including: complete campaigns, partial campaigns, demographic suggestions, location suggestions, or any other targeting or campaign related suggestion mined from the data.

Automation engine 172 may additionally provide functionality to automatically accept a recommended campaign based on criteria such as an advertising client's, goals, budget, pricing limits, desired campaign reach, and so forth. Campaign launcher 180 interfaces with the respective APIs 110A-C of the social networks 105A-C to launch, trigger, deploy, or otherwise start campaigns using the matched targeting parameters to the available targetable attributes of the social network. Content to be included in a campaign may also be recommended.

In some instances, data includes structured data and functionality targets specific data constructs provided by the social networks. Non-structured data, such as free text, may also be provided by, and targeted back to, the social networks. Both structured and non-structured data is capable of being aggregated by data aggregator 150.

Targeting parameters and other parsed data may be utilized to modify and optimize campaigns that are already running, by adjusting the targeting, pricing, and other campaign variables, in response to the signals from the recommendation engine 175.

FIG. 1B depicts another exemplary architecture 101 in accordance with described embodiments. The architecture is similar to that of FIG. 1A except that the data aggregator 150 and its associated functionality resides within the same host organization 199. Host organization may operate as a cloud based service provider which provides services to other entities, users, and organizations by making its functionality and various user interfaces accessible via the public Internet, a model often referred to as cloud computing.

Regardless of whether the data aggregator 150 exists internal or external to the host organization 199, data inputs 111A, 111B, and 111C are received by the listener 185 as depicted by the arrows marked with "1" originating from the respective APIs 110A-C. In certain embodiments the listener 185 pulls the data from the social networks 105A-C whereas in other embodiments the social networks 105A-C provide feeds which push or broadcast information to the listener 185. The listener 185 may subscribe on the basis of selections and filters, where, as in other embodiments, the listener 185 captures any raw data that is accessible to it.

The data inputs 111A-C themselves may consist of network metadata, user comments, user generated images, user videos, and other user-generated content and interactions occurring at the respective social networks 105A-C. Such user-generated content and interactions may include a variety of other metrics such as advertising data, Facebook Insights, temporal data, location data, and any other metadata that is be relevant.

In certain instances, the same human user may be interacting with more than one of the social networks where, as in other instances, users may be represented on only one of the social networks 105A-C. Regardless of the identity of the particular underlying users, the listener 185 captures the data inputs 111A-C from the social networks en masse, to the extent possible, for later analysis, filtering, and harvesting, by which contextually relevant campaigns and events can be launched.

The data inputs 111A-C are then passed to the data parser 160 as denoted by the arrows marked "2" which in turn is passed to the combiner 190 to be joined, combined, or aggregated by the combiner 190 into aggregate data 112 as indicated by the arrow marked "3."

The aggregate data 112 having parsed targeting parameters therein stored in a targeting parameters memory 165A as indicated by the arrow marked "4." At this point, data is broken down into targeting parameters representing specific concepts, trends, hash tags, locations, demographics, psychographics, keywords, or other such data elements having been culled from the larger data space of user data 115A-C generated at the respective social networks 105A-C.

In certain embodiments the analysis engine 155 subscribes to a service to receive the aggregate data 112, which may include broken down targeting parameters, whereas in other embodiments the analysis engine 155 operates cooperatively with a data aggregator 150 to render the aggregate data 112 and targeting parameters, and in yet other embodiments, a data aggregator 150 working cooperatively with the analysis engine receives some data inputs 111A directly from social networks' respective APIs 110A-C for a portion of its data inputs and subscribes to another data aggregator service to receive a different portion of its inputs, all of which are parsed via data parser 160 and then joined via the combiner 190 to output the aggregate data 112 and targeting parameters.

As depicted here, the host organization 199 may access social network service information using exposed Application Programming interfaces (APIs), such as the Chatter API, the Facebook API, Twitter API, etc., to retrieve the data inputs 111A. Such information may include user's identities (sometimes referred to as user handles or user IDs and other times the users' actual names), content posted by a user to a respective feed for a social network service, social graph data, metadata including whether comments are posted in reply to a prior posting, event, news article, and so forth. In certain instances, information accessible from the social networks or from a data aggregator 150 is anonymized so that specific users cannot be identified, but their activities on the social networks 105A-C can be tracked, monitored, and acted upon as to a class or group of anonymized users.

In certain embodiments, a first user's activities are connected with the activities of other users as part of the combiner's 190 aggregation. Connecting the user's activities may include building a model into which specific interaction data will be combined with other system, temporal, location, and other contextual data. In other embodiments, content by the respective users are combined and contribute to additional but separate records having a similar or the same contextual relevance, but are not linked or connected by the aggregator. In yet other embodiments, specific actions, comments, and content is keyed by a particular user's ID or handle and aggregated into a single aggregate data 112 output by the combiner.

Data parser 160 operates to identify keywords or activities which are extracted from the content published by users or exist within the social networks' 105A-C feeds.

To illustrate, consider that a first user may publish a status update to their Facebook wall stating: "My cat, Caption, just figured out how to open the front door!" This may be provided within the data inputs 111A as a record that contains the content only (e.g., the string) or may be part of a record with other relevant values such as the user's ID, the originating social network, a time stamp, IP address, device, other content, surrounding context, the venue in which the comment was posted (such as a being posted on a wall, a comment section responsive to another post or article, a public tweet, shout out, or other public message, etc.).

By aggregating the disparate streams and data content by the same user via a data aggregator 150, a recommendation engine 175 may subsequently access targeting database 165B having advertising conditions or targetable content organized by subject matter, from which to automatically recommend or trigger campaigns and/or advertisements that may be more relevant to the user. Continuing with the example about the user's cat "Caption," using disparate sources it may be recognized that the user's cat is a large cat rather than a domestic cat, from which more relevant content may be determined to include advertising for a nearby zoo, specialized veterinarians, or large animal enclosures, rather than say, cat food for small cats or worse yet, doors-related content. This is, of course, just one example, from which there are a vast many based on the user's activities across multiple social networks 105A-C when such data is connected by the data aggregator 150. In other embodiments, connecting the user's disparate postings is not a relevant consideration, for example, when the recommendation engine 175 is seeking to exploit higher volumes and emerging trends.

Regardless of the source or users affiliated with data within the data inputs 111A provided to the data parser 160, user activity data gathered from a first social network (e.g., 105A) can be parsed and aggregated with user activity data gathered from a second social network (e.g., 105B and/or 105C), from which one or more targeting parameters (e.g., key words, handles, hash tags, events, etc.) are extracted to identify a subject matter being discussed at the social networks. These targeting parameters are then stored within the targeting parameters memory 165A as indicated by the arrow marked "4."

Matching engine 170 then operates to match or correlate stored targeting parameters from the targeting parameters memory 165A with subject matter stored within the targeting database 165B, as is indicated by the arrows marked "5" leading to the matching engine 170. Stored targeting parameters are matched against advertising conditions or targetable content indexed by subject matter and other context so as to identify which targeting parameters are desirable or of potential interest for the sake of advertising or social media campaigns. Matching engine 170 may perform the matching operations by using the targeting parameters stored within targeting parameters memory 165A and correlating it to the subject matter stored within targeting database 165B on the basis of exact match, matching variants, matching filters, and so forth.

Recommendation engine 175 accepts the matches identified by matching engine 170 and applies further filtering to determine whether a match is of sufficient quality to constitute a recommendation to advertising clients or other campaigners seeking to promote their brands, products, or other messages. For instance, the recommendation engine 175 may evaluate the importance of a particular user as a target when such a user is highly influential, or may consider volume of the particular content being discussed at the social networks identified based on the targeting parameters, such as how many users are discussing the same topic. Alternatively, recommendation engine 175 may consider volume and acceleration (e.g., trending) of a topic or event based on how quickly its volume is increasing measured over a period of time, and so forth by measuring a change in the activity for particular targeting parameters based on measurements or counts taken at separate times. Each of these considerations are configurable by client advertisers so that recommendations provided to them are actionable and in alignment with their needs and business objectives.

The recommendations are provided to advertising clients via an interface, SMS, email, etc., from which the clients may elect to accept the recommendation and thus launch a campaign, thus causing the recommendation engine to pass the relevant targeting parameters and matched content to the automation engine 172 which automates the recommendation and acceptance of campaigns as indicated by the arrow marked "6" and then on to the campaign launcher as indicated by the arrow marked "7." For instance, automation operates as an alternative to a client accepting the recommendation. In a first scenario, a client accepts the recommendation manually at a UI responsive to which the campaign launches. In another scenario, the recommendation engine identifies what should happen based on a client constraints and advertising conditions from an automation engine evaluates pre-authorization criteria to automatically proceed straight to the campaign launcher without any manual intervention by the user.

The recommendation engine 175 may provide recommendations that are not particularized to any specific user's activities on any specific social network. For instance, recommendations may be user agnostic and/or social network agnostic. For example, rather than tracking a first user's specific activities on Twitter, the recommendation engine 175 may identify trending topics on Twitter and use the targeting parameters culled from the trending topic to match content from the targeting database 165B. In the targeting database 165B, subject matter can be identified and then recommended to an advertising client on the basis that the identified subject matter is relevant to a larger population of users, regardless of their identities. In other situations, trends may be used to limit the scope of users reached by the recommended campaign, in which the same users that are contributing to a trending topic then are reached by the advertising campaign or message on the basis of their participation or contribution to the trend itself. By identifying and displaying content in this fashion, a greater quantity of users may be influenced or users may be influenced with more specialized advertising campaigns which include advertising conditions that is contextually relevant to the user's own activities on the social network.

FIG. 1C depicts another exemplary architecture 102 in accordance with described embodiments. Here, campaign launcher 180 is deploying campaigns 113A, 113B, and 113C to the respective social networks as indicated by the arrows marked "8" pursuant to the recommendation engine's suggested campaign being accepted by an advertising client or other user. Automation engine may optionally provide automated activation of a campaign according to an advertising client's goals, preferences and prior configuration.

The analysis engine 155 may further determine whether advertising was interacted with in any fashion, either by impression, click-through, posting to another social network, re-posting by the first user on the social network where the content appeared, etc. In certain embodiments this is based on new or updated user's data 115A-C being received, aggregated, and returned to the analysis engine 155. In other embodiments, impressions are tracked at a target site, such as by counting impressions for images, quantity of content impressions from an ad-server, and so forth using information that may be aggregated from sources beyond the social networks actually targeted for the campaigns 113A-C. For example, loyalty card information can identify purchases made by users and keywords extracted from users activities on a social network may be aggregated with purchasing histories, thereby helping to identify products and services that might be of most interest to the users that were targeted by the campaigns 113A-C.

Aggregating information from the activities of a large population of social network users can be used to identify activity trends, providing the basis for predicting particular user behaviors. For example, having analyzed the commenting patterns of users on Twitter in a particular location, and finding a high incidence of conversations about cold and flu, or about adverse weather conditions, the data may then be utilized to target cold and flu medication, or wet weather clothes to users from this location, on this or another social network.

Alternatively, information aggregated and analyzed by the analysis engine 155 may indicate a user is interested in applying for a job. Such information may then be used by a recruiting company to generate content or recruiting leads, such as by initiating campaigns for social messaging or a job posting which may be responsibly delivered to the first user's LinkedIn account. The same fact pattern may accrue for many users also by filtering the incoming data and identifying the applicable trend or context for a larger group of users, responsive to which the recommendation engine 175 may suggest such a campaign to an advertising client and if accepted, then the campaign launcher 180 would then deploy the appropriate campaigns to the relevant social networks, which may or may not be the same social networks from which the targeting parameters were culled and upon which the matching took place. Stated differently, data may be collected and parsed from a first set of social networks and then contextually relevant campaigns may be deployed to social networks other than the first set or in addition to the first set.

Aggregated data can additionally be used by a CRM system, such as is offered by salesforce.com, inc. For example, aggregated data may be used to identify opportunities, leads, contacts, and so forth, in a CRM system, or may be used to support marketing campaigns with products such as Radian6™, Buddy Median™ services, and the like. This CRM data may also then in turn be used to find these specific users again on these social networks, using matching tools provided by the social network providers. Additionally these could also be layered with specific targeting that we learnt from the aggregation and analysis by the data aggregator 150 and analysis engine 155 respectively.

The recommendation engine 175 provides recommendations to advertising clients, other users or to the automation engine 172, seeking to deploy campaigns 113A-C on the basis of contextually relevant and targeting parameters that are culled from users' social network activities and content which are therefore more likely to be relevant and influential to the users reached by the campaigns 113A-C.

What does not work well is to simply pick an advertisement and then display it to users hoping they are in the right frame of mind when reached by the ad. Social networking makes the more precise targeting described herein feasible by listening to data being generated on the social networking sites, aggregating data across multiple social networking sites, and then isolating or parsing the targeting parameters that advertising clients are looking for based on their preferred advertising conditions, for instance, as stored within the targeting database 165B. Advertising conditions or targetable content may include triggers for brands, key words, competitors, football players, news events, and so forth.

The aggregate data 112 is normalized by data parser 160 to identify things that can be utilized for campaigns 113A-C on the social networks 105A-C. Trends may be identified by the matching engine 170 or the analysis engine, and the aggregated data 112 may be filtered to remove noise so as to arrive upon a set of data that is actionable for the one or more social networks 105A-C that an advertising client is seeking to target.

FIG. 1D depicts another exemplary architecture 103 in accordance with described embodiments. One of the problems with aggregating data and then seeking to deploy advertising campaigns across multiple social networks 105A-C is that each social network implements its own API and controls what content is targetable for that network. For example, Twitter tends to have a narrow and somewhat restrictive set of targeting parameters at present whereas Facebook conversely has a very large and expansive set of targeting parameters. Moreover, targeting parameters and advertising conditions evolve over time. The matching engine 170 implements functionality to systematically adapt to such changes by systematically issuing test probes or relevant test queries to the respective APIs 110A-C of the social networks 105A-C being targeted for campaigns.

For instance, matching engine 170 may issue test queries 114A, 114B, and 114C to the respective social networks 105A-C as indicated by the arrow marked "9." Once the data parser 160 culls relevant key words or events from the data and the matching engine 170 matches, via a targeting database, an index of things targetable on the various platforms, such as pre-vetted targeting parameters. If targeting parameters do not match an element in the targeting database, then the matching engine can probe a social network's API to determine if the targeting parameter exists. If it does exist, the element will be added to the targeting database. If it does not exist, the targeting parameter will be returned as not-targetable. In such a way, the matching engine 170 may issue the test queries 114A-C to trigger query responses 116A, 116B, and 116C from the social networks' APIs which will specify whether, for example, the key word, handle, event, or other subject matter specified by the query is valid and acceptable to the social network, as is indicated by the arrows marked "10" which are directing back the query responses 116A-C to the matching engine 170.

For instance, the matching engine 170 may query the social network regarding whether specific targeting keywords or objects on the social graph may be reached by an advertising campaign specifying, for example, a specific hash tag or a specified key word. The test query 114A-C may be submitted in the form of a request for quote, where the API 110A-C will return an error if the targeting parameters are not acceptable or return a pricing structure and audience size (e.g., campaign reach) if they are feasible, from which the matching engine 170 will advise the recommendation engine as to the pricing and feasibility of a campaign. When the targeting parameters are not acceptable, the matching engine may trigger subsequent test queries 114A-C in an effort to identify, for example, synonyms for key words, or alternative targeting parameters that would suffice for an attempted campaign.

In one embodiment, where feasible targeting parameters cannot be identified, the matching engine 170 triggers a no match and the recommendation engine 175 will not reach an advertising client with the potential campaign due to its infeasibility.

Where acceptable targeting parameters are identified by the matching engine, the recommendation may present a campaign or a suggestion for targeting for a campaign. Such a recommendation may be a complete campaign, a targeting phrase to use, or even potentially a demographic targeting recommendation.

In certain embodiments, additional filtering is applied at the recommendation engine to screen or narrow feasible campaigns that are recommended to any particular advertising client. For instance, campaigns may be ranked based on how well they match to adverting conditions and constraints as defined by the advertising client. The filters and specification of what the advertiser is looking for may operate as a separate module, such as a definition index (e.g., as shown at element 264 of FIG. 2A) that can be used in either the data aggregator 150 or in the analysis engine 155 to perform the filtering. The targeting database or definition index may then provide a list of known targetable fields for each social network.

Campaigns may be filtered according to a number of fields, pricing. Recommendations may be provided other than complete campaigns, for instance, parameters and other options to improve existing campaigns or seed a new campaign, with some, but not all, of the parameters required fora complete campaign. Campaigns may be scored or ranked according to pricing, sentiment, intent, location, time decay, or the extent of reach.

In one embodiment, the recommendation engine measures a change in velocity over time for a given targeting parameter or advertising conditions. For instance, analysis may find that specific targetable content or parameters are found to be mentioned 1,000 times in the first hour, then an hour later 2,000 mentions, then 10,000 after that. Regardless of the times and quantities utilized, acceleration and volume of a topic, that is, the change in mass or popularity of a topic over time, may increase the likelihood that a campaign will be recommended to the client or service for acceptance.

Velocity may be affected by or proportional to the quantity of likes, social mentions, tweets, re-tweets, or hash tags for a given content, subject matter, or other key word. Each may also be affected by a weighting, for instance, where re-tweets may be worth more in a proportional scoring scheme than original tweets, and so forth.

In one embodiment, the matching engine 170 yields key words that have been defined based on the topics that are interesting to the client based on advertising conditions or targetable content stored within the targeting database 165B. Advertising conditions may alternatively be utilized from a definition index, in which the client doesn't define what to target, but instead, the client defines what sort of content to look for, and out of that may come interesting things to target via an advertising campaign.

For instance, the analysis engine 155 may parse the data for an expression or for three separate key words and then look through the targeting database 165B searching to match against specified advertising conditions on behalf of one or more clients. The analysis engine 155 may additionally verify that targeting parameters are permissible from the social networks.

In one embodiment, the matching engine 170 iterates through the aggregated data seeking known valid targeting parameters that can be pushed directly into the social networks via campaigns. Known valid targeting parameters may be stored in the targeting database and may additionally be stored within a client-side module accessible to an advertising client's UI.

For instance, the targeting engine 170 may analyze the aggregated data rather than using targeting parameters to identify any one of a set of hash tags related to a conversation that is likely to be of interest to an advertising client based on the advertising conditions provided by the targeting database 165B or definition index. The matching engine 170 may seek to target specified hash tags and handles and then using those, when identified in the aggregate data according to rendered targeting parameters, recommend a campaign to an advertising client and then push the campaign directly into Twitter, or Facebook, or LinkedIn, or whatever social networks conform to the guidelines of the approved campaign. Recommendations may additionally identify which network to target. In such a way, the content specified by advertising clients is utilized to sift through the aggregated data for matches rather than using the culled data targeting parameters from the aggregated data to seek out matches according to the advertising conditions specified by advertising clients. In certain embodiments, one or both approaches are utilized simultaneously.

Certain embodiments utilize thresholding to filter whether a campaign is recommended to a client, and thus, the matching engine may evaluate key words for popularity on the social networks for a period of time and evaluate whether sufficient interest or popularity is present to make a recommendation to the advertising client. If popularity is changing for a given topic, the matching engine may additionally map the topic to a newsworthy event, meme, referenced content, or other subject matter which may be combinable due to their contextual relevance, so as to increase the reach for a given campaign.

Figure 2A:
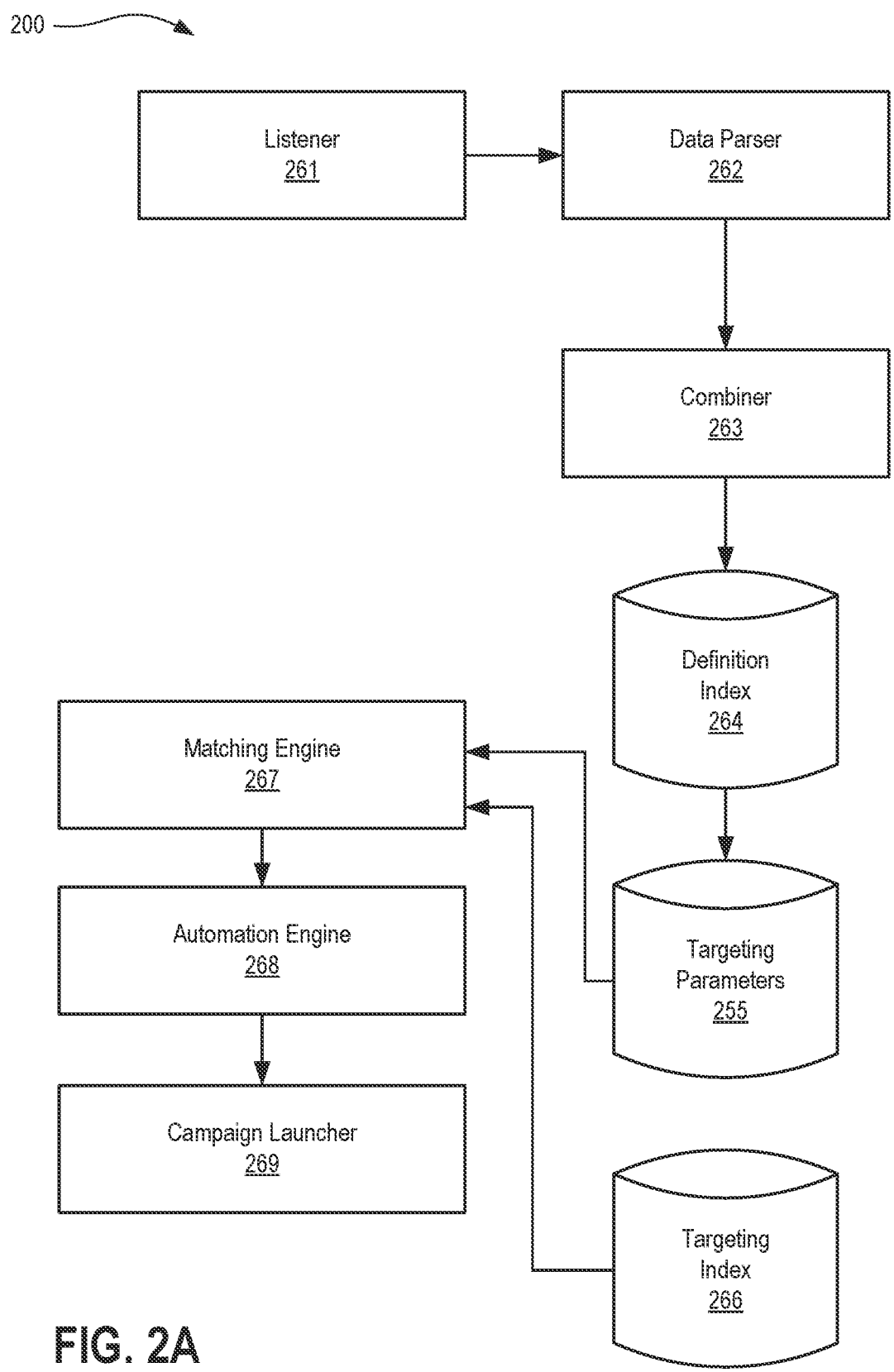
FIG. 2A depicts another exemplary architecture in accordance with described embodiments.

FIG. 2A depicts another exemplary architecture 200 in accordance with described embodiments. The exemplary architecture 200 depicted here includes listener 261, data parser 262, combiner 263, definition index 264, targeting parameters 255, targeting index 266, matching engine 267, automation engine 268, and campaign launcher 269.

The definition index 264 replaces targeting database described previously and operates to determine what to target by defining the scope and type of data that is interesting to an advertiser.

Targeting parameters 255 provides an index of pre-vetted and targetable elements on the social networks, that are previously identified using the probe method described previously. Targeting index 266 defines scope as defined or set by the advertiser. Rather than being pre-determined and known advertising conditions as described in prior examples, the targeting index 266 does not perform targeting directly, but instead allows the aggregated data feed to be checked against the targeting index to determine if yet-to-be determined subject matter falls within an acceptable scope that could be utilized for targeting purposes.

Thus, according to the depicted embodiment, a method exists by which aggregated data is checked against defined scope at the definition index 264 and then the aggregated data is further checked against the targeting index 266 in search of additional subject matter that may match, and if a match exists, then the matched data is utilized in recommending a social media campaign along with other previously known and determined targeting parameters 255.

The automation engine 268 depicted herein operates to completely eliminate the process of recommending social media campaigns to the users and seeking authorization and instead operates to directly deploy appropriate social media campaigns by launching the campaign automatically without any user interaction whatsoever.

For instance, if the advertiser defines that they would like to automate their campaigns, then automation engine 268 will perform the previously described analysis, but will proceed to automatically launch a selected campaign without intervention from the advertiser in any manner. Rather than issuing a recommendation to the advertiser's user interface (e.g., such as the process described at FIG. 2C) the automation engine 268 supplants such functionality by negating the recommendation and authorization operations allowing processing subsequent to matching to advance directly to the campaign launcher 269 through the automation engine's 268 processing.

Figure 2B:
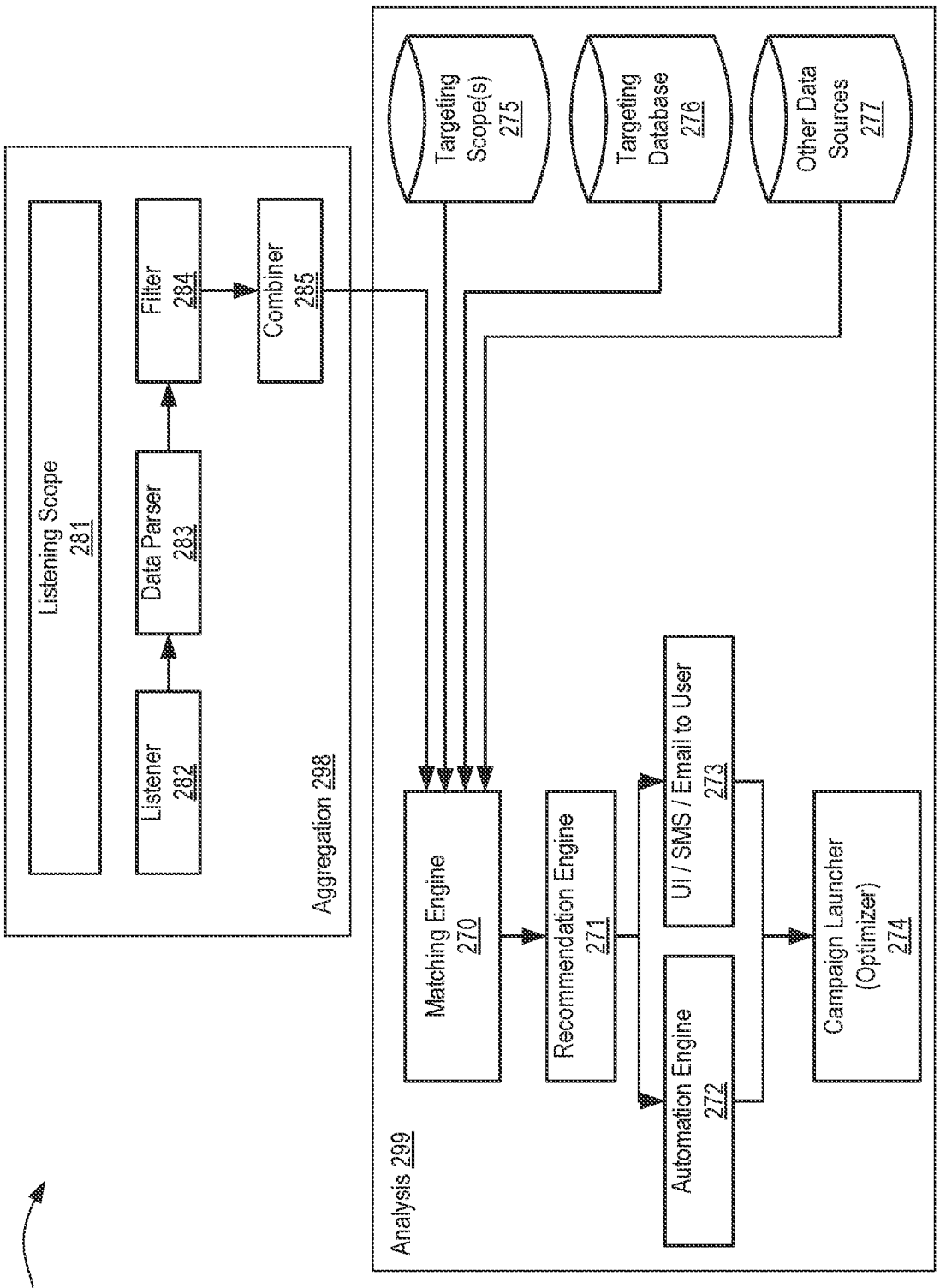
FIG. 2B depicts another exemplary architecture in accordance with described embodiments.

FIG. 2B depicts another exemplary architecture 201 in accordance with described embodiments. The exemplary architecture 201 includes an aggregation 298 block and an analysis 299 block. Within the aggregation 298 block are listing scope 281, listener 282, data parser 283, filter 284, and combiner 285. Combiner 285 from the aggregation 298 block feeds to the matching engine 270 of the analysis 299 block. Within the analysis 299 block are targeting scope(s) 275, targeting database 275, and other data sources 277, each of the three feeding into matching engine 270. Matching engine within the analysis block 299 then feeds into recommendation engine 271 which feeds each of the automation engine 272 and UI/SMS/Email to user 273 block, depending on whether campaigns are to be automated (without human user intervention) or recommended and require authorization. Automation engine 272 and UI/SMS/Email to user 273 blocks then feed to the campaign launcher 274 (and optimizer) block.

According to such an embodiment, there are two scopes defined. Listening scope 281 and targeting scope(s) 275, both of which are defined by an advertiser. Listening Scope 281 exists in the aggregation 298 block (e.g., within an aggregation engine) and utilizes listener 282 to listen to the sources that are relevant, such as Twitter, Facebook Pages, Forums, FB Insights, and so forth. Listener 282 listens to the data by referencing a database of keywords, phrases, locations, data formats, hash tags, and anything else that helps to focus the data eventually digested. Listener 282 listens for both structured data, such as known values and keywords returned from the APIs, and also listens for unstructured data, such as text in posts, comments, tweets, and so forth. The listener 282 discovers interesting data from the sources defined and available for reference by the listener 282.

Aggregation 298 performed by, for example, an aggregation engine, implements four distinct operations according to the embodiment shown here, including: Listening, via listener 282, then parsing via data parser 283, then filtering via filter 284, and lastly combining via combiner 285. The databases provided by the listening scope 281 operate cooperatively with the first three blocks of aggregation 298, including listening, parsing, and filtering.

Targeting scope(s) 275 provides a definition index (e.g., refer to FIG. 2A at element 264) which serves to determine what to target by defining the scope and type of data that is interesting to an advertiser. Unlike targeting database of element 165B at FIG. 1A, the Targeting scope(s) 275 define constraints of what an advertiser desires to target based on the product or service the advertiser is marketing. For example, in a particular campaign the advertiser may only be looking to target (a) the United States, (b) men, and (c) 18-25 years old, each set forth as constraints rather than positively defined targetable subject matter to be targeted. The targeting scope(s) 275 could be one or many databases of information that perform the scoping role. For instance, a database that stores an advertiser's preferences for pricing versus audience size, campaign goals, excluded sites, and so forth.

If the targeting scope(s) 275 are being utilized to optimize existing campaigns, the advertiser may then define via targeting scope(s) 275 the actual campaigns that are to be optimized.

Targeting database 276 defines the known universe of available targeting options. These may be determined by prior successful campaigns, determined via test probes, determined based on output from the social networks' APIs, and so forth. Targeting database 276 provides sources that are built over time and known to be available for use.

Matching engine 270 ingests or consumes data from the aggregation 298 (e.g., received from an aggregation engine) consumes data from targeting scope(s) 275 sources, consumes data from other data sources 277 such as known targeting databases and any other internal or other external information sources that may help the decision making implemented by matching engine 270. The matching engine 270 finds the intersection of all of these data inputs to understand what interesting and targetable data is available. Such interesting and targetable data available is then passed to the recommendation engine 271, which analyzes the quantitative, contextual, or otherwise useful metadata associated to these targeting options, in order to formulate the recommendations on what to do next.

Recommendations that are output by recommendation engine 271 may include complete campaigns, targeting suggestions, recommended content, or campaign optimization suggestions for an existing campaign that is already in use. Such recommendations may be passed to the user via the UI/SMS/Email to the user 273 or the recommendations output by the recommendation engine 271 may alternatively be passed to the automation engine 272 to automatically create new, or optimize existing, campaigns based on the data passed from the matching engine 270 and processed by recommendation engine 271. In particular, the campaign launcher (optimizer) 274 creates new campaigns or optimizes existing ones in the manner described.

FIG. 2C depicts another exemplary architecture 202 in accordance with described embodiments. In certain embodiments, the recommendation engine 175 provides a user interface 205 for advertising clients or other end users seeking to deploy campaigns. Here the user interface 205 is depicted with a launch 215 button and multiple available campaigns are displayed, some of which have been selected, others have not. In this depiction, campaign 210A is selected, campaign 210B is not selected, campaign 210C is not selected, campaign 210D is selected, and campaign 210E is also selected. Alternatively, not all recommendations need to be campaigns. For instance, recommendations may take on many forms including recommending complete campaigns, partial campaigns, targeting options, optimizations for existing campaigns, and so forth.

With the user interface 205 depicted here, the user is provided with a simple interface option (e.g., a 1-click or minimal click interface) by which they can simply launch 215 the desired campaigns that have been suggested to them by the recommendation engine 175, for instance, based on analysis by the analysis engine in concert with previously specified parameters, advertising conditions, targetable content, creative, suggestions, thresholds, pricing, and so forth. Different embodiments are also feasible such as two-clicks, multiple selections, as well as fully automated based on initial constraints and client preferences. For instance, the recommendation engine 175 may email recommended campaigns to the end user which can be accepted simply by reply email, or the recommendation engine 175 may interact with an end user responsible for authorizing campaigns by posting to the end user's wall or messaging the end user, or tweeting the end user, and so forth, in which a response or a certain type of response is deemed authorization based on the end user's preferences.

In this depiction, campaign 210A is expanded to show an exemplary view of the sorts of additional information that may be presented to an advertising client. For instance, depicted here are details with regard to pricing, reach, e.g., the social networks reached and the quantity of expected impressions, targeting parameters utilized in the campaign, and lastly, some combination of text, link, image, video, flash and/or other rich media.

Campaigns deployed to social media networks will very often be some combination of text, link, image, video, flash and/or other rich media, that are posted to a wall, tweeted to users, messaged to a user's handle, and so forth. For instance, a message may be shared with the targeted users and then a link provided which links to a client's website, product page, image, video, and so forth.

In certain embodiments, some combination of text, link, image, video, flash and/or other rich media are pre-generated based on the content preferences configured and stored in advance on behalf of advertising clients. In other embodiments, the advertising client enters the desired some combination of text, link, image, video, flash and/or other rich media before deploying the campaign.

The simplified 1-click click or minimal-click interface reduces interactions required with the advertising client and allows them to respond quickly to actionable events occurring within the social media space. Even where reach is relatively small, a campaign may nevertheless be worthwhile to create drive response, or create brand awareness through engendered affinity with particular users based directly on their contextually relevant remarks or actions on the social networks, and so forth. However, where an advertising campaign targets a popular group of people, it may be more expensive, and advertiser's conditions and constraints as well as pre-approval parameters, if used, can accommodate such varying costs through configurable parameters accessible to an advertising client.

In certain embodiments, the user interface 205 may also display to the user ongoing and active campaigns, as well as impression counts or other metrics for an authorized campaign, by which the advertising client can monitor progress for a campaign and correlate the campaign to other metrics, such as new incoming leads, a change in sales, etc.

Not all campaigns are monetary. For instance, political campaigns may seek to increase name recognition, especially to those users having an affinity for topics or values assessed to be compatible with that of a politicians, and governments and charitable organizations may simply seek to inject themselves into relevant conversations so that social network users are made more aware of services and projects associated with such organizations.

In this depiction, the user interface 205 has been sent to remote computing device 250 for display to a user, and within remote computing device 250 the user interface 205 is reproduced as displayed UI 255. Upon clicking the launch 215 button, a signal would be transmitted back to the recommendation engine 175 along with which of the campaigns are selected, and thus authorized for deployment.

Figure 3:
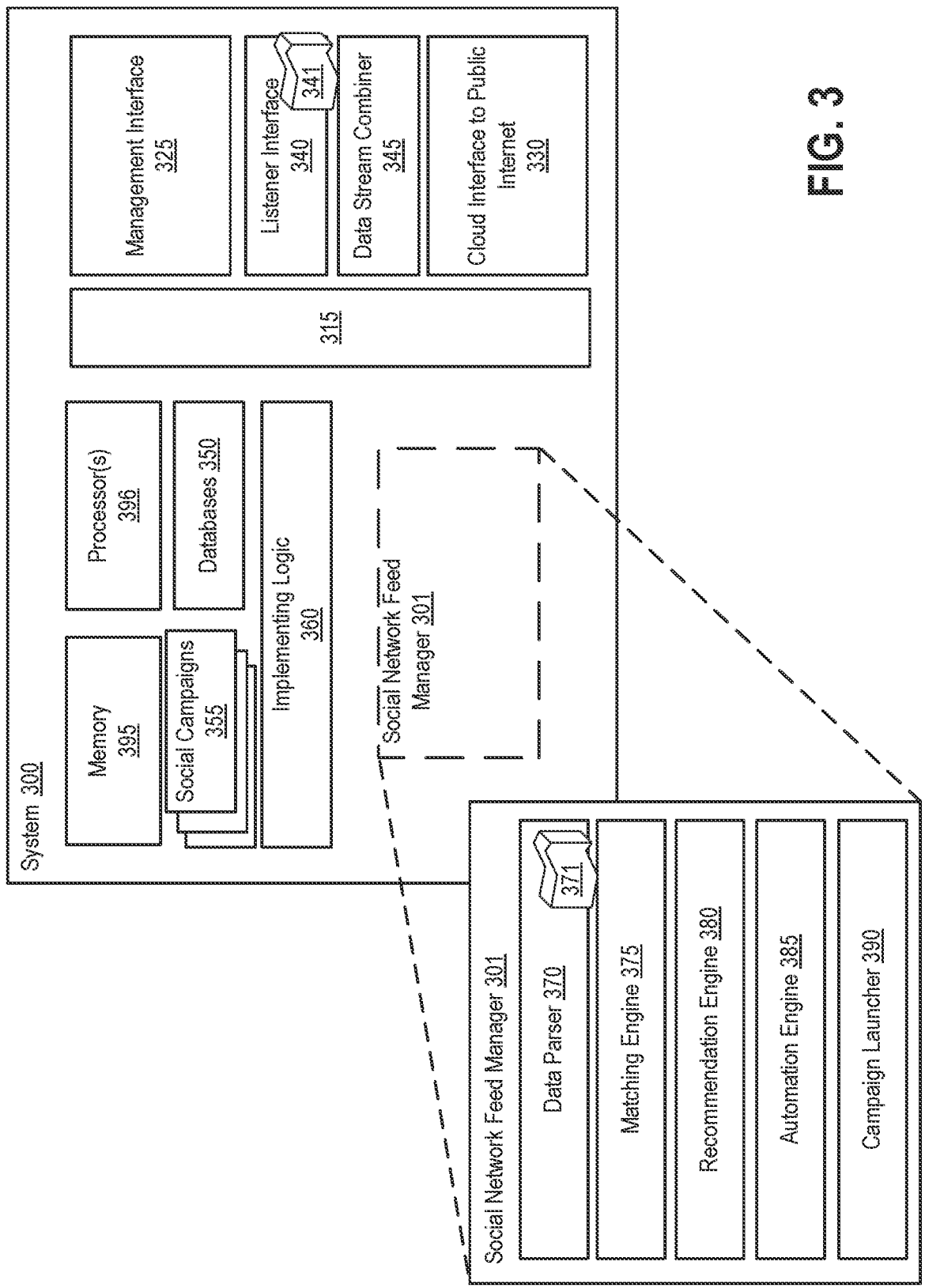
FIG. 3 illustrates a diagrammatic representation of a system in accordance with which embodiments may operate, be installed, integrated, or configured.

FIG. 3 illustrates a diagrammatic representation of a system 300 in accordance with which embodiments may operate, be installed, integrated, or configured.

In one embodiment, system 300 includes a memory 395 and a processor or processors 396. For example, memory 395 may store instructions to be executed and processor(s) 396 may execute such instructions. Processor(s) 396 may also implement or execute implementing logic 360 having logic or instructions to implement the methodologies discussed herein. System 300 includes communication bus(es) 315 to transfer transactions, instructions, requests, queries, targeting parameters, and data within system 300 among a plurality of peripheral devices communicably interfaced with one or more communication buses 315. System 300 further includes management interface 325, for example, to receive requests, return responses, and otherwise interface with network elements located separately from system 300 such that system 300 may be managed, for instance, by administrators of a host organization for the system 300.

System 300 further includes cloud interface to public Internet 330 to communicate from system 300 to social media users, for instance, via a public Internet. System 300 further includes a database 350 that may store targeting parameters, advertising conditions, targetable content, advertising client preferences, as well as pertinent information. System 300 further includes a listener interface 340 to receive user activity data streams and/or aggregated data from social networks or external data aggregators respectively.

System 300 may further include social campaigns 355 stored on behalf of client advertisers or other users seeking to trigger deployment of the social campaigns. The databases 350 and the social campaigns 355 may be stored upon a hard drive, persistent data store, a database, or other storage location within system 300, or within communicably interfaced systems such as a multi-tenant database system within which client advertisers may store their social campaigns as well as advertising conditions.

Distinct within system 300 is social network feed manager 301 which includes the data parser 370, matching engine 375, recommendation engine 380, automation engine 385 automatically sends recommendations to users via a user interface without human intervention and may alternatively be utilized to fully automate the recommendation and acceptance of a campaign without human interaction based on specified criteria. Campaign launcher 390. Social network feed manager 301 may be installed and configured in a compatible system 300 as is depicted by FIG. 3, or provided separately so as to operate in conjunction with appropriate implementing logic 360 or other software.

In accordance with one embodiment there is a system 300 having a processor 396 and a memory 395 therein, in which the system 300 further includes: a listener interface 340 to receive user activity data 341 from one or more social networks; a data parser 370 to parse the user activity data and output a plurality of targeting parameters 371 culled from the user activity data; a matching engine 375 to match one or more of the plurality of targeting parameters 371 with advertising conditions or targetable content for a social media campaign, in which the advertising conditions of the social media campaign is contextually relevant to the one or more targeting parameters matched; a recommendation engine 380 to recommend the social media campaign via a user interface of a second computing device; and a campaign launcher 390 to receive authorization to launch the social media campaign or to automatically determine the social media campaign is authorized based on pre-defined parameters. In such an embodiment, the campaign launcher 390 is to deploy the social media campaign to one or many of the social media networks responsive to authorization.

In another embodiment, system 300 further includes a data stream combiner 345 to receive the user activity data from the one or more social networks; the data stream combiner 345 to aggregate the user activity data from the one or more social networks into aggregated data; and in which the data stream combiner 345 passes the aggregated data to the data parser 370.

Figure 4:
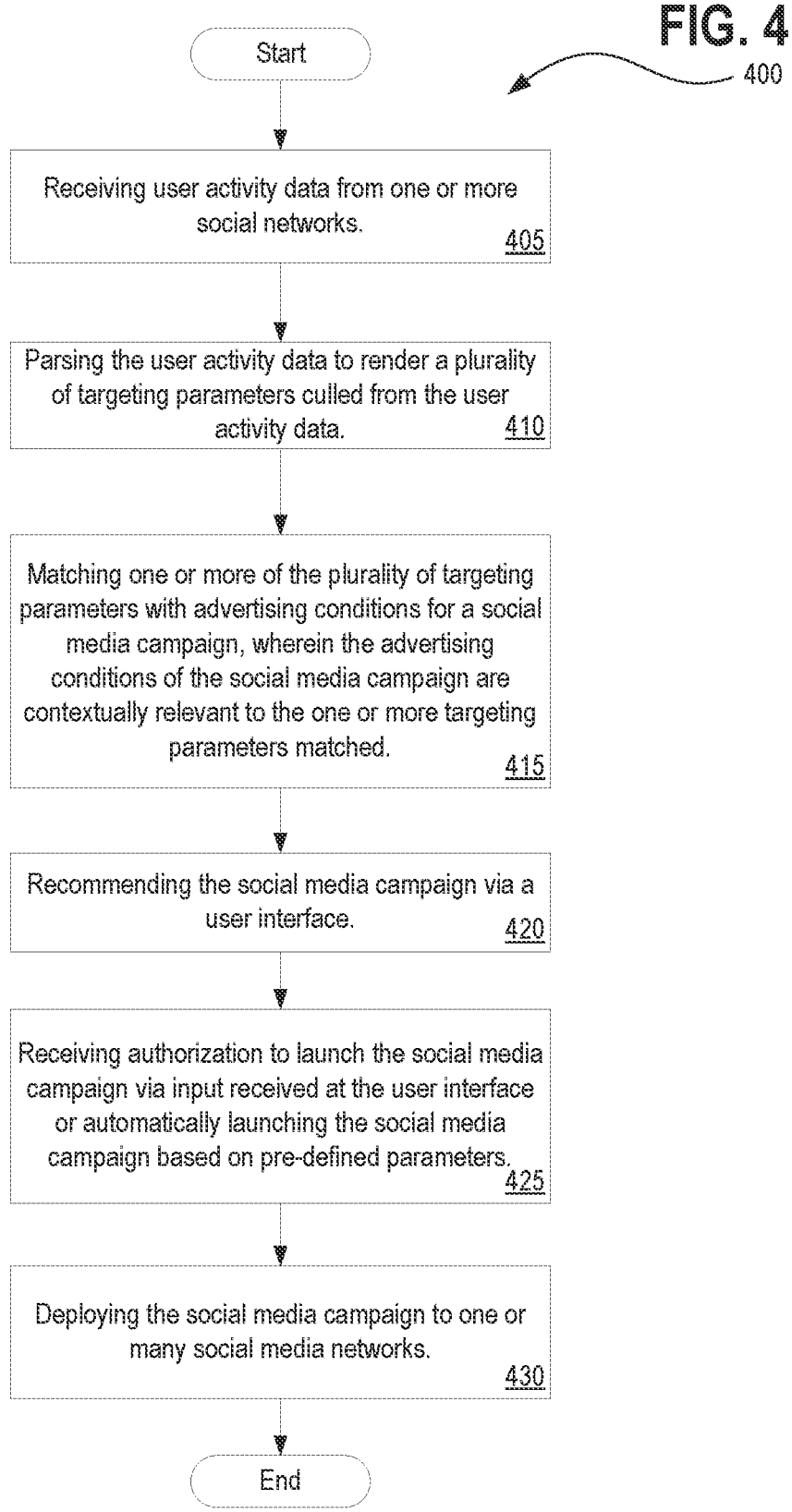
FIG. 4 is a flow diagram illustrating a method in accordance with disclosed embodiments.

FIG. 4 is a flow diagram illustrating a method 400 in accordance with disclosed embodiments. Method 400 may be performed by processing logic that may include hardware (e.g., circuitry, dedicated logic, programmable logic, microcode, etc.), software (e.g., instructions run on a processing device to perform various operations such transmitting, sending, receiving, monitoring, matching, parsing, recommending, updating, calculating, evaluating, etc., in pursuance of the systems, apparatuses, and methods for aggregating social network feed information, as described herein. For example, a computing device implementing the analysis engine at element 155 of FIG. 1, system 300 at FIG. 3, or machine 500 at FIG. 5 may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic receives user activity data from one or more social networks.

At block 410, processing logic parses the user activity data to render a plurality of targeting parameters culled from the user activity data.

At block 415, processing logic matches one or more of the plurality of targeting parameters with advertising conditions for a social media campaign, wherein the advertising conditions of the social media campaign are contextually relevant to the one or more targeting parameters matched.

At block 420, processing logic recommends the social media campaign via a user interface. For instance, a recommendation engine may display a simple interface to a remote computing device through which a user may interact and approve the social media campaign.

At block 425, processing logic receives authorization to launch the social media campaign via input received at the user interface or automatically launching the social media campaign based on pre-defined parameters.

At block 430, processing logic deploys the social media campaign to one or many social media networks.

According to another embodiment of method 400, receiving user activity data from one or more social networks includes receiving aggregated data as input from a single source, the single source having aggregated the user activity data of the one or more social networks into the aggregated data as received.

According to another embodiment of method 400, receiving user activity data from one or more social networks, includes: listening to a first data stream having the user activity data from a first of the one or more social networks; listening to a second data stream having the user activity data from a second of the one or more social networks; combining the first and second data streams of the user activity data into aggregated data; and in which the aggregated data is input to the parsing the user activity data operation.

According to another embodiment of method 400, the user activity data includes user activity data originated by social network users of at least one of: Facebook's social network; LinkedIn's social network; Twitter's social network; Chatter's social network; Instagram's social network; Pinterest's social network; user comment data from a blogging website; user review data from a review site; and user comment data from a news website.

According to another embodiment of method 400, the user activity data includes data pertaining to users' activities, comments, connections, likes, social mentions, tweets, re-tweets, handles, hash tags, reviews, system data, location data, and/or other metadata, as generated within either of the one or more social networks as the users engage with the social networks.

According to another embodiment of method 400, weightings are applied to the targeting parameters based on type; and in which the automatically recommending the social media campaign via a user interface includes selecting the social media campaign from multiple social media campaigns based at least in part on the weightings applied to the targeting parameters matched for the selected social media campaign.

According to another embodiment of method 400, automatically recommending the social media campaign via a user interface includes: counting a quantity of occurrences for the one or more targeting parameters matched at $time_1$; determining volume and acceleration for the one or more targeting parameters matched by comparing the quantity of occurrences at $time_1$ and the quantity of occurrences at $time_2$; and automatically recommending the social media campaign when the velocity exceeds any one of a threshold, a user defined formula; a user defined algorithm, a developer defined formula; a developer defined algorithm.

According to another embodiment, method 400 further includes: determining whether the one or more targeting parameters matched correspond to a trending topic on the social networks; and in which automatically recommending the social media campaign includes selecting the social media campaign from multiple social media campaigns based at least in part on the one or more targeting parameters matched corresponding to the trending topic.

According to another embodiment of method 400, automatically recommending the social media campaign via a user interface includes: displaying a 1-click interface to the user interface having multiple eligible social media campaigns ready for deployment to the social networks pending the authorizing to launch from the user, in which any or all of the multiple eligible social media campaigns are selectable; receiving authorization to launch all selected ones of the multiple eligible social media campaigns responsive to a user's input to the displayed 1-click interface; and deploying all the selected ones of the multiple eligible social media campaigns responsive to receiving the authorization to launch.

According to another embodiment of method 400, matching one or more of the plurality of targeting parameters with advertising conditions for a social media campaign, includes: selecting one of the targeting parameters; comparing the selected targeting parameter against records in a targeting database having the advertising conditions for a plurality of social media campaigns stored therein for a match; and repeating the selecting and the comparing until at least one of the plurality of targeting parameters are matched.

According to another embodiment of method 400, matching one or more of the plurality of targeting parameters with advertising conditions for a social media campaign, includes: selecting one of a plurality of records from a targeting database, each record having the advertising conditions for one of a plurality of social media campaigns therein; comparing the selected record against the plurality of targeting parameters to determine if a match is present; and repeating the selecting and the comparing until at least one of the plurality of records are matched with the one or more targeting parameters. It is also permissible that no match be found.

According to another embodiment, method 400 further includes: determining whether targeting parameters exist at the social media networks for the one or more targeting parameters contextually relevant to the social media campaign, in which the targeting parameters are used to deploy the social media campaign using the one or more targeting parameters matched.

According to another embodiment of method 400, determining whether targeting parameters exist at the social media networks includes: sending test queries to the social media networks specifying the targeting parameters; and receiving query responses from the social media networks indicating the targeting parameters are valid.

According to another embodiment of method 400, determining whether targeting parameters exist at the social media networks includes validating the targeting parameters against a targeting database.

According to another embodiment of method 400, a host organization implements the method via an analysis engine operating at computing architecture of the host organization including at least a processor and a memory; in which the user interface operates at a second computing device remote from the host organization and communicatively interfaced with the host organization via a public Internet; and in which the host organization operates as a cloud based service provider to the second computing device.

According to another embodiment of method 400, the social media campaign includes some combination of text, link, image, video, flash and/or other rich media; and in which deploying the social media campaign to one or many of the social media networks includes instructing the social media networks to share the combination of text, link, image, video, flash and/or other rich media of the social media campaign to social media users associated with the one or more targeting parameters culled from the user activity data.

According to another embodiment of method 400, instructing the social media networks to share the combination of text, link, image, video, flash and/or other rich media of the social media campaign includes one or more of: tweeting the social media campaign specifying handles of the social media users; re-tweeting a tweet by each of the social media users and adding some combination of text, link, image, video, flash and/or other rich media when re-tweeting; posting a response with the combination of text, link, image, video, flash and/or other rich media to a wall of the respective social media users; and private messaging the respective social media users with the combination of text, link, image, video, flash and/or other rich media.

According to another embodiment, method 400 further includes: evaluating, via an automation engine, pre-authorization conditions by an advertising client to launch the social media campaign; and launching the advertising campaign subject to the pre-authorization conditions bypassing the recommending and receiving authorization operations.

According to another embodiment of method 400, deploying the social media campaign to one or many of the social media networks includes: interfacing to an Application Programming Interface (API) of each of the social media networks; and issuing the social media campaign to each of the social media networks via targeting parameters available at the API of the social media networks to specify the one or more targeting parameters matched and social media users to be targeted by the social media campaign or criteria for which social media users are to be reached by the social media campaign.

According to another embodiment of method 400, deploying the social media campaign to one or many of the social media networks includes one or more of: specifying a maximum, a minimum, or a range of permissible cost expenditure for the social media campaign to each of the respective social media networks; specifying a maximum, a minimum, or a range of permissible time to live for the social media campaign; specifying a maximum, a minimum, or a range of permissible budget for the social media campaign; and specifying a maximum, a minimum, or a range of permissible number of social media users to be reached by the social media campaign.

According to another embodiment, method 400 further includes: monitoring effectiveness of the deployed social media campaign based on one or more of: page loads for analytics on a website corresponding to a web-link shared via the social media campaign; a change in web-traffic for a client having authorized the social media campaign subsequent to deploying the social media campaign; conversion points using code provided locally or using code other by web analytics companies; social mentions of the client having authorized the social media campaign subsequent to deploying the social media campaign; likes, thumbs up, and/or thumbs down for the social media campaign shared or the client having authorized the social media campaign subsequent to deploying the social media campaign; replies to the social media campaign shared; or any other measurable goal defined by the advertiser.

According to another embodiment, method 400 further includes: evaluating plurality of targeting parameters culled from the user activity data for sentiment; and eliminating any of the plurality of targeting parameters evaluated to correspond with negative sentiment. For instance, positive new stores, funny events, memes, and the like may be consider by the advertising client to be appropriate triggers for social media campaigns where as negative news stories may be better left alone so as to avoid associating an advertising client's brand or product with a negative sentiment. Conversely, government outreach and charity programs may actively seek out negative sentiment news stories, such as a hurricane, tornado, and so forth, as a contextually relevant means by which to reach out to affected users to provide services or to encourage non-affected persons to contribute. For example, the Red Cross may seek out negative sentiment news stories for the sake of fund raising or services awareness.

According to a particular embodiment, there is a non-transitory computer readable storage media having instructions stored thereon that, when executed by a processor in a computing device, the instructions cause the computing device to perform operations including: receiving user activity data from one or more social networks; parsing the user activity data to render a plurality of targeting parameters culled from the user activity data; matching one or more of the plurality of targeting parameters with advertising conditions for a social media campaign, in which advertising conditions of the social media campaign is contextually relevant to the one or more targeting parameters matched; automatically recommending the social media campaign via a user interface; receiving authorization to launch the social media campaign via input received at the user interface; and deploying the social media campaign to one or many of the social media networks.

Figure 5:
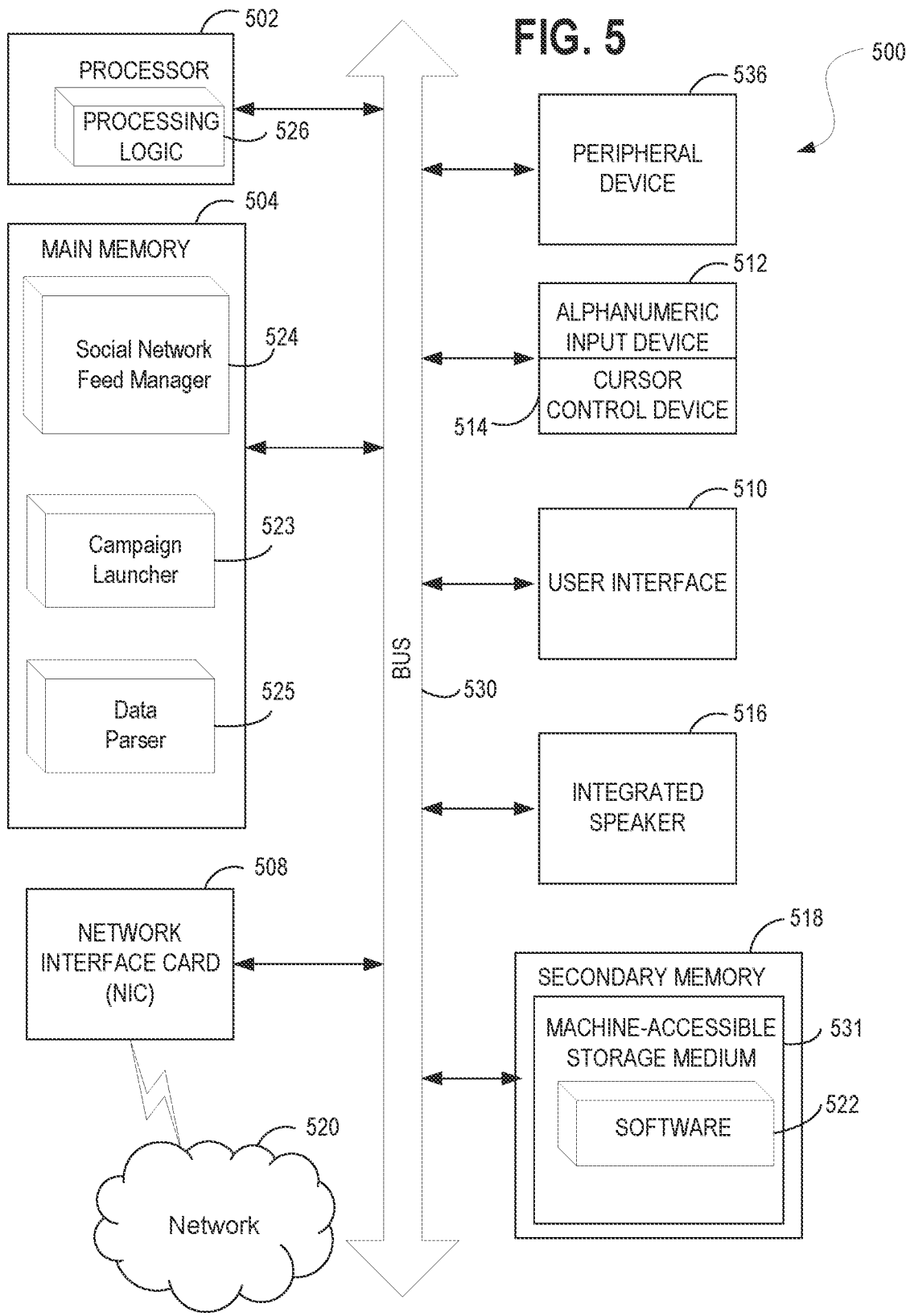
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a social network feed manager 524, a campaign launcher 523, and a data parser 525. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

Figure 6:
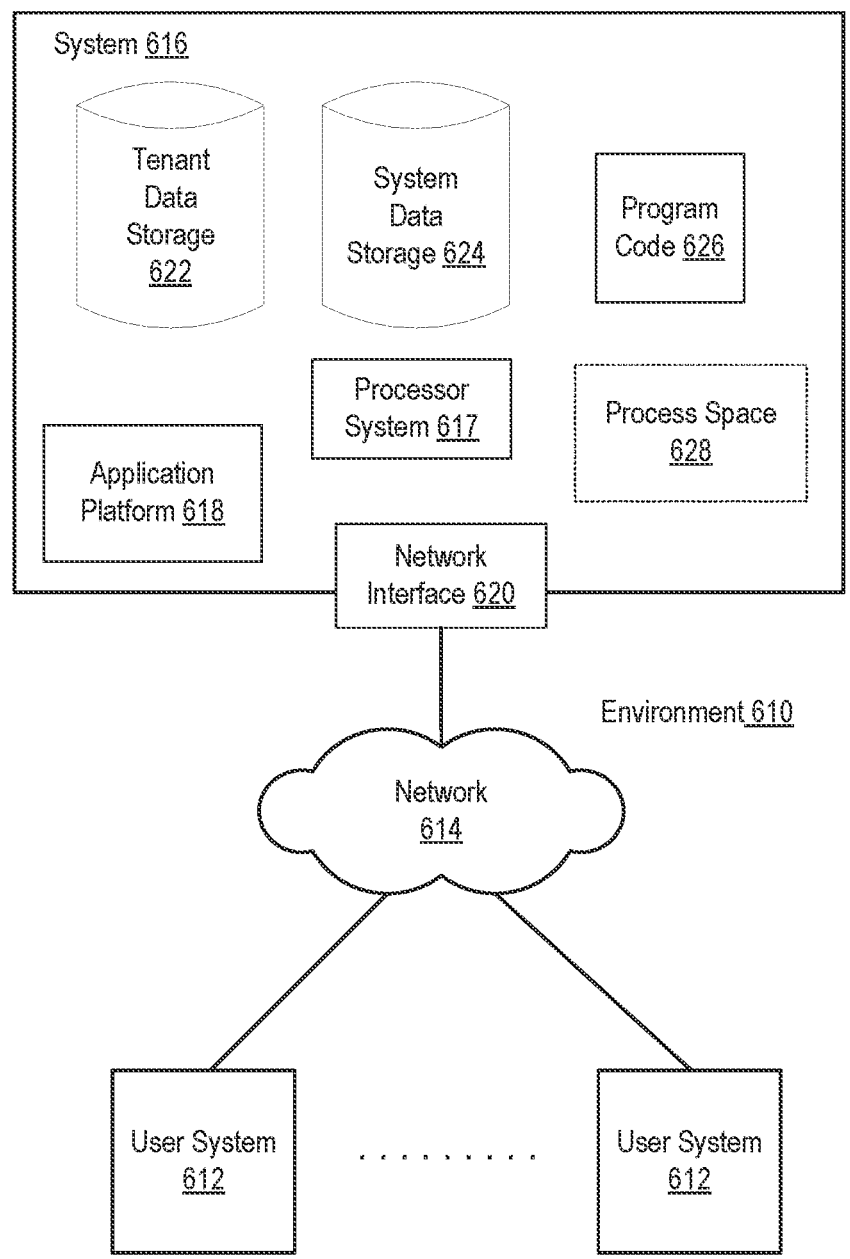
FIG. 6 illustrates a block diagram of an example of an environment in which an on-demand database service might be used.

FIG. 6 illustrates a block diagram of an example of an environment 610 in which an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Google's Chrome browser, Microsoft's Internet Explorer browser, Opera's browser, or a mobile browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
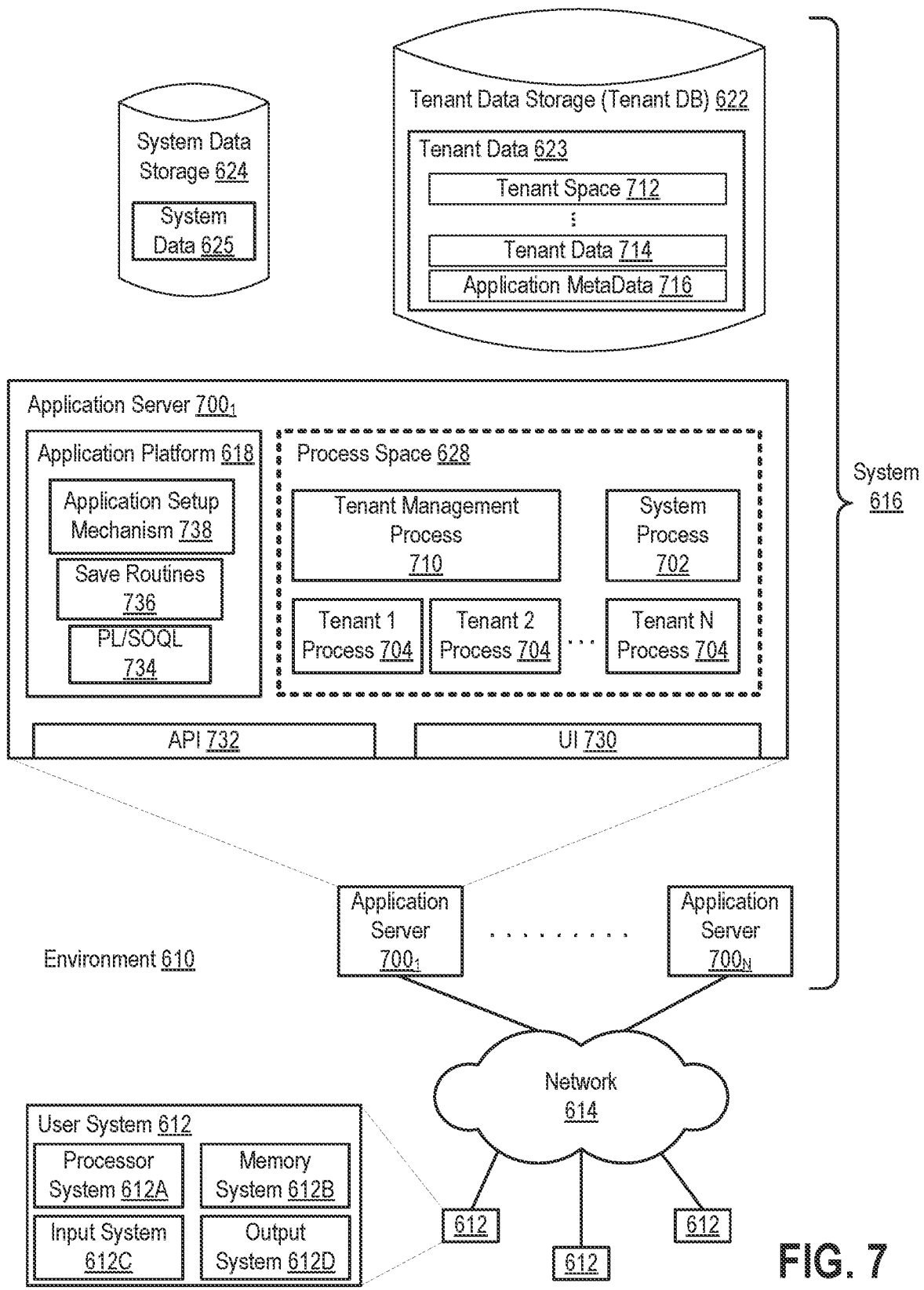
FIG. 7 illustrates a block diagram of an embodiment of elements of FIG. 6 and various possible interconnections between these elements.

FIG. 7 illustrates a block diagram of an embodiment of elements of FIG. 6 and various possible interconnections between these elements. FIG. 7 also illustrates environment 610. However, in FIG. 7, the elements of system 616 and various interconnections in an embodiment are further illustrated. FIG. 7 shows that user system 612 may include a processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

The invention claimed is:

1. A method comprising:
   receiving user activity data indicating user activity on a first social media network;
   determining that one or more targeting parameters is contained within the user activity data;
   matching the one or more targeting parameters within the user activity data with advertising conditions for a social media campaign; and
   deploying, based on the matching, the social media campaign to a second social media network, the deploying comprising:
      determining a quantity of occurrences for the one or more targeting parameters matched during a first time period;
      determining a quantity of occurrences for the one or more targeting parameters matched during a second time period;
      determining volume, velocity, and/or acceleration for the one or more targeting parameters matched by comparing the quantity of occurrences during the first time period and the second time period; and
      providing the social media campaign when the volume, velocity, and/or acceleration exceeds a threshold.

2. The method of claim 1, wherein the matching the one or more targeting parameters comprises determining that the advertising conditions are associated with the one or more targeting parameters.

3. The method of claim 1, wherein the providing the social media campaign comprises recommending the social media campaign to the second media network, and wherein the method further comprises:
   receiving authorization to launch the social media campaign, wherein the deploying the social media campaign is based on the receiving the authorization to launch the social media campaign.

4. The method of claim 3, wherein the recommending comprises causing a recommendation to be communicated via a user interface of a user device.

5. The method of claim 4, wherein the receiving the authorization comprises receiving an input indicating authorization from the user device.

6. The method of claim 3, wherein the receiving the authorization comprises receiving pre-authorization to automatically launch the social media campaign based on pre-defined parameters.

7. The method of claim 3, wherein the receiving the authorization comprises receiving an automatic authorization.

8. The method of claim 1, wherein the receiving the user activity data comprises receiving aggregated data as input from a single source.

9. The method of claim 8, wherein the aggregated data comprises first user activity data aggregated from one or more social media networks.

10. The method of claim 1, wherein the receiving the user activity data comprises:
    listening to a first data stream comprising first user data from the first social media network.

11. A computer program product comprising computer-readable program code capable of being executed by one or more processors when retrieved from a non-transitory computer- readable medium, the program code comprising instructions configurable to cause operations comprising:
    receiving user activity data indicating user activity on a first social media network;
    determining that one or more targeting parameters is contained within the user activity data;
    matching the one or more targeting parameters within the user activity data with advertising conditions for a social media campaign; and
    deploying, based on the matching, the social media campaign to a second social media network, the deploying comprising:
       determining a quantity of occurrences for the one or more targeting parameters matched during a first time period;
       determining a quantity of occurrences for the one or more targeting parameters matched during a second time period;
       determining volume, velocity, and/or acceleration for the one or more targeting parameters matched by comparing the quantity of occurrences during the first time period and the second time period; and
       providing the social media campaign when the volume, velocity, and/or acceleration exceeds a threshold.

12. The computer program product of claim 11, wherein the matching the one or more targeting parameters comprises determining that the advertising conditions are associated with the one or more targeting parameters.

13. The computer program product of claim 12, wherein the providing the social media campaign comprises recommending the social media campaign to the second media network, wherein the operations further comprise:
    receiving authorization to launch the social media campaign, wherein the deploying the social media campaign is based on the receiving the authorization to launch the social media campaign.

14. The computer program product of claim 13, wherein the recommending comprises causing a recommendation to be communicated via a user interface of a user device.

15. The computer program product of claim 14, wherein the receiving the authorization comprises receiving an input indicating authorization from the user device.

16. The computer program product of claim 13, wherein the receiving the authorization comprises receiving pre-authorization to automatically launch the social media campaign based on pre- defined parameters.

17. The computer program product of claim 13, wherein the receiving the authorization comprises receiving an automatic authorization.

18. The computer program product of claim 11, wherein the receiving the user activity data comprises receiving aggregated data as input from a single source.

19. The computer program product of claim 18, wherein the aggregated data comprises first user activity data aggregated from one or more social media networks.

20. The computer program product of claim 11, wherein the receiving the user activity data comprises:
   listening to a first data stream comprising first user data from the first social media network.

\* \* \* \* \*